US006195455B1

United States Patent
Mack et al.

(10) Patent No.: US 6,195,455 B1
(45) Date of Patent: Feb. 27, 2001

(54) IMAGING DEVICE ORIENTATION INFORMATION THROUGH ANALYSIS OF TEST IMAGES

(75) Inventors: Walter J. Mack, Chandler; Jean-Charles Korta, Phoenix, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/108,436

(22) Filed: Jul. 1, 1998

(51) Int. Cl.[7] .................................................. G06K 9/00
(52) U.S. Cl. ................................. 382/154; 348/42; 356/3
(58) Field of Search .................................... 382/106, 154, 382/151; 348/42, 47; 356/3, 4.02, 6, 12; 345/419, 139

(56) References Cited

U.S. PATENT DOCUMENTS 5,699,444 * 12/1997 Palm .................................... 382/106

OTHER PUBLICATIONS

R. Y. Tsai, "A Versatile Camera Calibration Technique for High–Accuracy 3D Machine Vision Metrology Using Off–the–Shelf TV Cameras and Lenses" IEEE J. Robotics Automat, RA–3(4): 323–344, 1987.

Y. F. Wang, "Characterizing Three–Dimensional Surface Structures from Visual Images, Transactions on Pattern Analysis and Machine Intelligence" 13(1): 52–60, 1991.

Brian Curless & Marc Levoy, "Better Optical Triangulation through Spacetime Analysis", Proc. 5th Int. Conf. Computer Vision, pp. 987–993, 1995.

Z. Yang and Y. F. Yang, | "Error Analysis of 3D Shape Construction from Structured Lighting", Pattern Recognition, 29(2): 189–206, 1996.

Photograph of Turing Institute Calibration object taken on Mar. 13, 1998.

* cited by examiner

*Primary Examiner*—Bhavesh Mehta
(74) *Attorney, Agent, or Firm*—Blakely, Sokoloff, Taylor & Zafman LLP

(57) ABSTRACT

A method and apparatus for calibrating an imaging device having an image sensor is disclosed. A deviation of the image sensor with respect to a chosen coordinate system is determined. A roll of the image sensor with respect to the chosen coordinate system is determined. A pin hole coordinate with respect to the chosen coordinate system is determined.

22 Claims, 12 Drawing Sheets

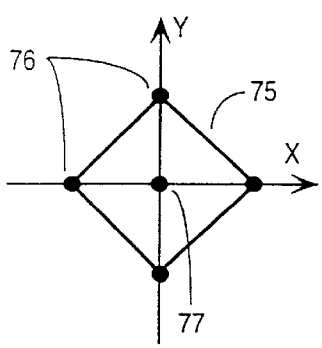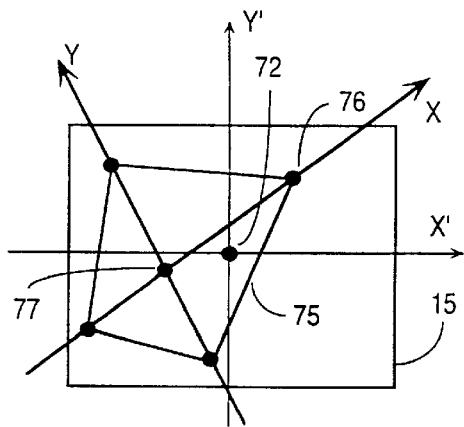
Fig. 8a  Fig. 8b
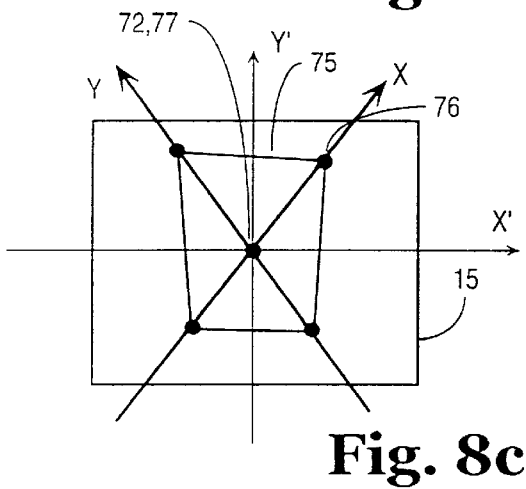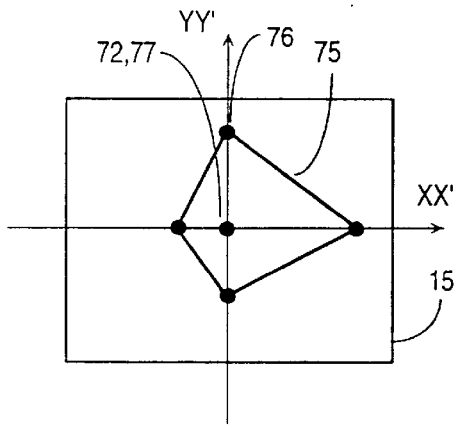
Fig. 8c  Fig. 8d
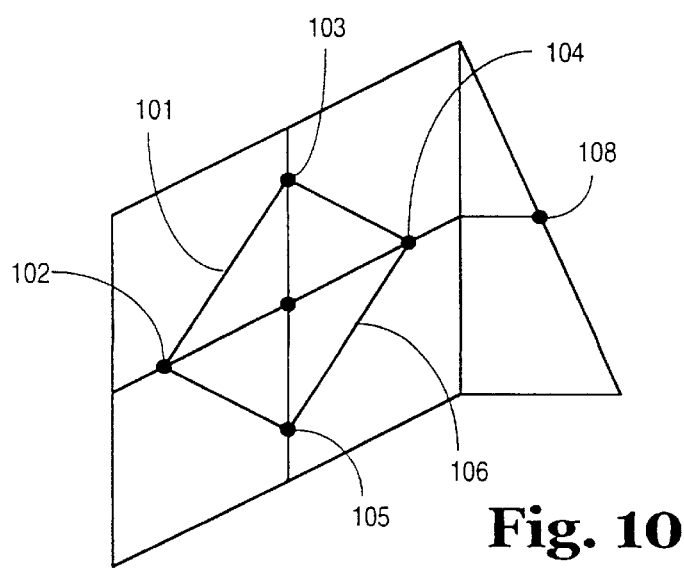
Fig. 10

IMAGING DEVICE ORIENTATION INFORMATION THROUGH ANALYSIS OF TEST IMAGES

BACKGROUND OF THE INVENTION

1. Field of the Invention

The present invention relates generally to three-dimensional (3-D) models and, in particular, to a method and apparatus for obtaining imaging device orientation information through analysis of test images.

2. Background Information

Creating three-dimensional (3-D) models of objects allow the models to be viewed from many different angles unlike two-dimensional (2-D) models that may only be viewed from one angle. One method of creating 3-D models is to take a multitude of images of real objects from different positions and exploit the differences in the objects' projection. These multitude of images may be suitable to produce 3-D models of the object. Once a 3-D model is produced, the 3-D model could be placed in a virtual world and may be shared with others, much like photos or TV. In particular, the commercial viability of 3-D models is remarkably pronounced in the entertainment, advertisement, and simulation industries.

The multitude of images may be captured using an imaging device such as a camcorder or a digital camera, for example, in a 3-D imaging device system. However, before any images may be captured for 3-D modeling, the position and orientation of each imaging device should be determined. This determining procedure is known as calibration. The reason for the calibration is that the computer used to create the 3-D data must know the relative position of the imaging devices with respect to a coordinate system (e.g. Cartesian, polar, etc.), which may be arbitrarily positioned in space, so that each coordinate image point of the captured image of one imaging device may be correlated with an image point in the captured image of the other imaging device. Through this correlation, the location of features of the 3-D object may be determined in the chosen coordinate system. In other words, X, Y, Z coordinates of the features of the target object may be determined corresponding to points in 3-D space which is the 3-D data.

One calibration method could be mechanically positioning the imaging devices on to a calibrated bar fixture with known fixed points so that once positioned, the imaging devices are calibrated. However, this method would require highly sophisticated calibrating equipment and an expensive calibrated bar. This is due to the high degree of accuracy required in a 3-D imaging device system. Further, a highly trained personnel would be required to make such adjustments. Additionally, due to the requirement that the calibration must be precise, such calibration would have to be performed in the factory and once calibrated, the position of each imaging device must remain unaltered.

This method is cumbersome in that when the user desires to adjust the distance between the imaging devices, for example, to take a stereoscopic image of a small object or a large object, the user is unable to do so because the user does not have the sophistication to make the calibration after the adjustment. Further, if the 3-D imaging device system is subjected to some knocking (shock, etc.) or mechanical manipulation that de-aligns the imaging devices, the system would be required to be returned to the factory or authorized dealer for recalibration with suitable equipment and methods, possibly at great expense. This results in the loss of usage and frustration to the user. Furthermore, in mechanically calibrating the imaging devices, it is assumed that the photosensitive area (i.e. image sensor) is properly aligned with the imaging device. However, many times, the image sensor may not be aligned resulting in the mechanically well aligned imaging device to be mis-aligned accordingly. Therefore, what is needed is a method and apparatus of calibrating the 3-D imaging device system that can be performed with ease by the user and overcomes the shortcomings of the method described above.

BRIEF SUMMARY OF THE INVENTION

A method and apparatus for determining position and orientation of an imaging device having an image sensor with respect to a chosen coordinate system is disclosed. A deviation of the image sensor with respect to the chosen coordinate system is determined. A roll of the image sensor with respect to the chosen coordinate system is determined. A pin hole coordinate with respect to the chosen coordinate system is determined.

BRIEF DESCRIPTION OF THE DRAWINGS

The objects, features and advantages of the method and apparatus for the present invention will be apparent from the following description in which:

FIG. 8a illustrates an exemplary calibration target and

FIGS. 8b–8d illustrate views of the calibration target from the image sensor's perspective as the image sensor is being calibrated;

FIG. 10 is another exemplary embodiment of a calibration target;

DETAILED DESCRIPTION OF THE INVENTION

In creating three-dimensional (3-D) models of real objects, a multitude of images of real objects are taken from different positions to exploit the differences in the objects' projection. The multitude of images may be captured, for example, by an imaging device such as a camcorder or a digital camera comprising an image sensor. The image sensor generally comprises a photosensitive pixel array where each pixel captures an incident light falling on it. Thus, the combination of the pixels within the pixel array is able to capture an image from the incident light. Generally, a surface of the object to be re-constructed into a 3-D model should be present in at least two images since the re-construction is based on the surface intersection of the two images. These two or more images (i.e. stereoscopic image) of the object having the above characteristics are suitable for subsequent processing into 3-D models.

In taking a stereoscopic image of an object, several issues are taken into consideration. First, the object should not change its position or shape while the images are taken. Second, the object should be such that the features on its surface are located identically for all images. This is not true for specular reflections where the features change locations as the location of the imaging device is changed. Third, the path of the light should be essentially straight for the invention to function properly. In other words, the projection of an image should not be distorted due to modifications in its path. As an example, glass should not be in the path of the projected image since glass has the tendency to bend a path of light. However, one skilled in the art will recognize that an image may be compensated for the discrepancies if the mentioned conditions exist during stereoscopic image capture.

Figure 3A:
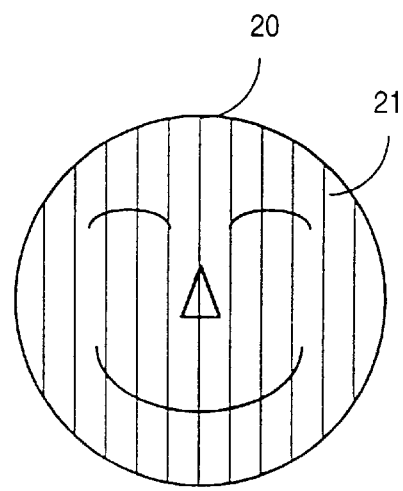
FIG. 3a illustrates a target object to be stereoscopically imaged.
Figure 3B:
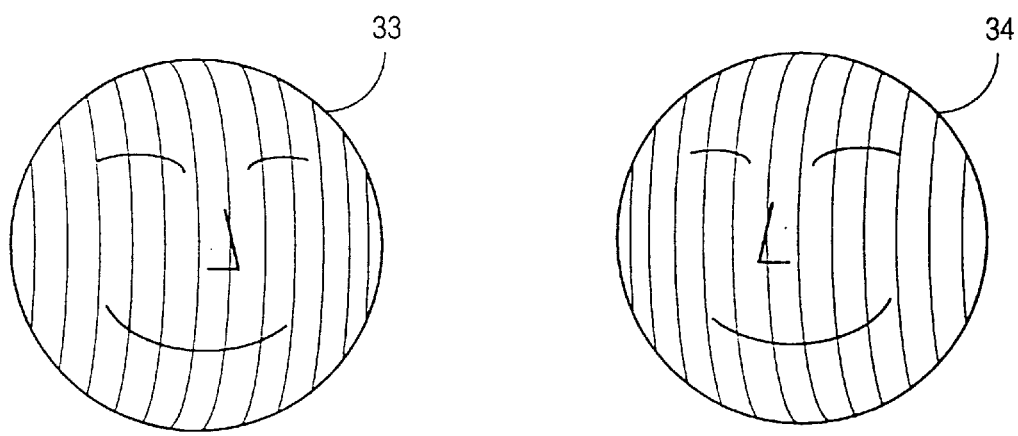
FIG. 3b illustrates a stereoscopic image of the target object.
Figure 3C:
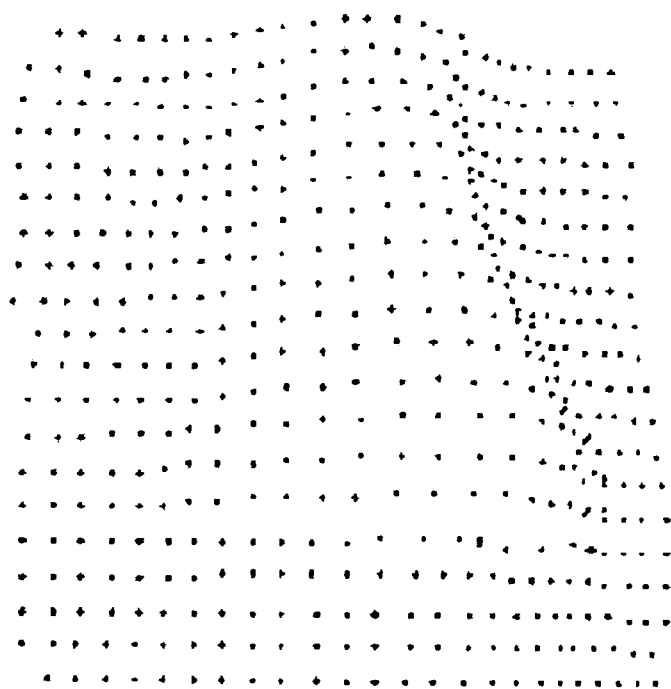
FIG. 3c illustrates extracted 3-D data.

FIGS. 3a–3c illustrate an example of 3-D data being extracted from a target object. FIG. 3a is the target object, in this instance, a face. By capturing images of the object from different positions using an imaging device, face 33 and face 34 may be captured as illustrated in FIG. 3b which is a stereoscopic image of the face. One could verify that the projection of the face as captured by the imaging device changes predictably as the position of the imaging device is changed. Note the images captured by the imaging device contain only two-dimensional (2-D) data because each image is contained in the plane of the image sensor which is two dimensional. However, where there is an intersection of at least two images of a surface of the face from two different positions, a depth Z value may be obtained for each point in one image that has a corresponding point in the other image with respect to an arbitrary coordinate system having X, Y, Z coordinates that is common to both image sensors. Furthermore, the positions of the two corresponding points in the two image sensors expressed by X', Y' coordinate in the image plane may be combined to produce a 3-D point (i.e. X, Y, Z value) which may be one of the points in 3-D data. Thus, 3-D data is a plurality of points in 3-D space identified within a coordinate system to form a 3-D point image of the target object, an example which is illustrated in FIG. 3c. Obtaining X, Y, Z value of a point in the target object will be described further below. Examples of 3-D imaging device systems to capture stereoscopic images of objects will now be described.

Figure 1:
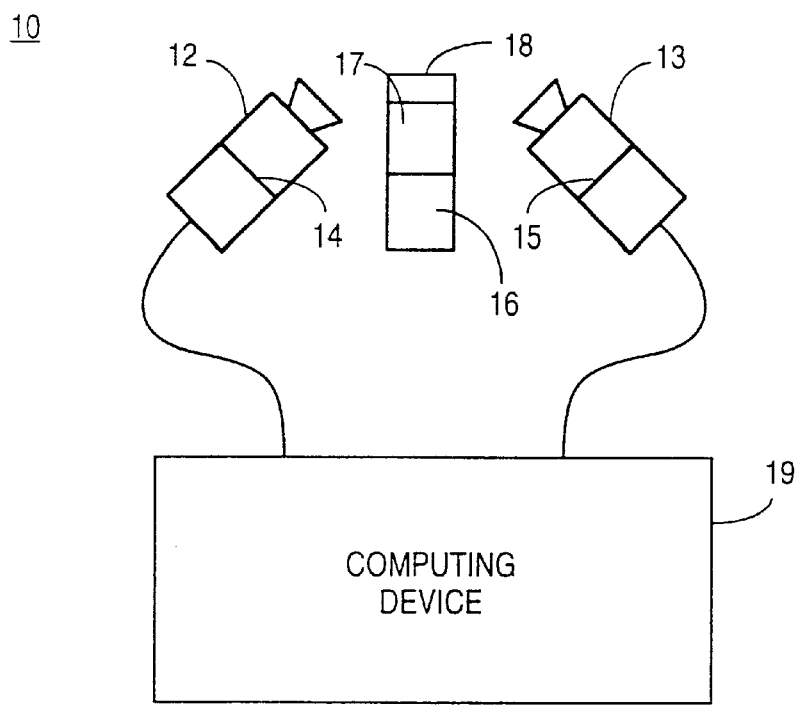
FIG. 1 illustrates an exemplary three-dimensional (3-D) imaging device system.
Figure 3D:
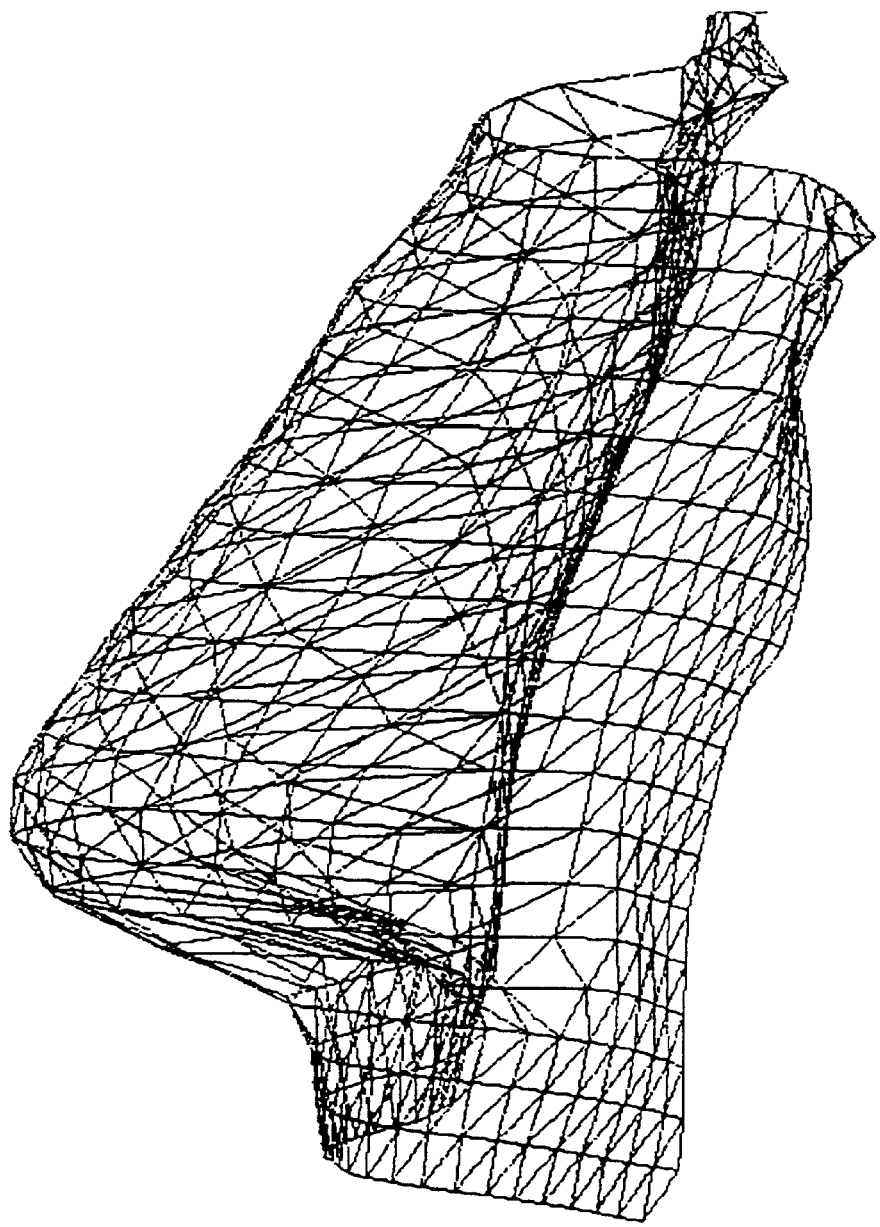
FIG. 3d illustrates surface structure formed on 3-D data.

FIG. 1 illustrates an embodiment of a 3-D imaging device system. The 3-D imaging device system 10 illustrated is shown with two imaging devices which for ease of understanding the invention will be designated left imaging device 12 and right imaging device 13. The designation is mentioned throughout the description, however, one skilled in the art would recognize from reading the description that the designation may be interchangeable and further, the invention is applicable where more than two imaging devices are used or under suitable conditions, where only one imaging device is used. Each imaging device 12 and 13 comprises an image sensor 14 and 15 that is able to capture an image of a target object. The 3-D imaging device system 10 may include a computing device 19 to process a stereoscopic image captured by the imaging devices 12 and 13 into 3-D data. The computing device may be a microprocessor, an arithmetic logic unit (ALU) or any other devices capable of processing data information. In one embodiment, the computing device 19 may even process the 3-D data into 3-D models depending on the sophistication of the underlying software. As an example, 3-D data may be "triangulated" (i.e. forming the surface of the object by forming triangles with every three points of the 3-D data) using conventional algorithm such as Delaunay's algorithm. One skilled in the art will recognize that other algorithms may be used including suitable geometric structures. An example of a triangulated structure is illustrated in FIG. 3d. Textural data may be applied to the triangulated structure by using, for example, True Space, a software commercially available from Caligary, Mountain View, Calif. Generally, textural data comprises material information such as physical surface properties of an object and may also comprise color information of the object. Alternatively, the images may be stored in the imaging devices 12 and 13 to be processed at a later time eliminating the need for a computing device in the 3-D imaging device system. Generally, "calibration" information, to be described further below, relating to the 3-D imaging device system 10 is stored in a memory device which may be coupled with or may be part of the computing device 19. However, in a 3-D imaging system 10 where the computing device 19 is not used, the system 10 may comprise a memory device to store calibration information or the calibration information may be separate from the system and introduced when the stereoscopic images are being converted into 3-D data.

The 3-D imaging device system 10 may further comprise a light device 16 to project an originating light beam and a diffracting device 17 to split the beam into an adequate pattern of lines, grids, dots or any other geometrical patterns. As an example, the diffracting device may be one commercially available from Digital Optics Corporation, Charlotte, N.C. or Rochester Photonics, Rochester, N.Y. The term "structured light" will be understood to mean structures comprising lines, strips, segmented lines, grids, dots, etc. produced by a light source. The reason for the structured light is to provide a structure to the target object that is easily recognizable by a computing device. In other words, it is difficult for the computing device to match one point in one image to the corresponding point in another image with information obtained from the natural features of the target object alone. As an example, if a human face is the object to be 3-D modeled and the eye is the feature to be matched, the computing device may err because it may not be able to distinguish between the two eyes in the other corresponding image or the other features. However, by using structured light, the contours of the object can be easily referenced by a computing device in terms of the location of the vertical lines, for example. In one embodiment, each vertical line in the structured light may be coded to distinguish one vertical line from another. Coding is desirable where the contour of a target object causes the vertical lines to emerge, for example. In this instance, the computing device may err by jumping from one vertical line to another. By providing a code for each line, the computing device knowing the code of the vertical line will detect an error when the code of the line being traced has changed and may be able to re-trace back to correct the error. The lines may be coded by using a suitable filter 18, for example, coupled with one end of the diffracting device 17. For example, the code may be the segmentation of the vertical line into a pattern different from the other vertical lines in the close proximity. The filter 18 may have slits allowing the vertical lined structured light to be emitted but may have blockages in the slits corresponding to the desired segmented patterns of vertical lines.

Figure 4:
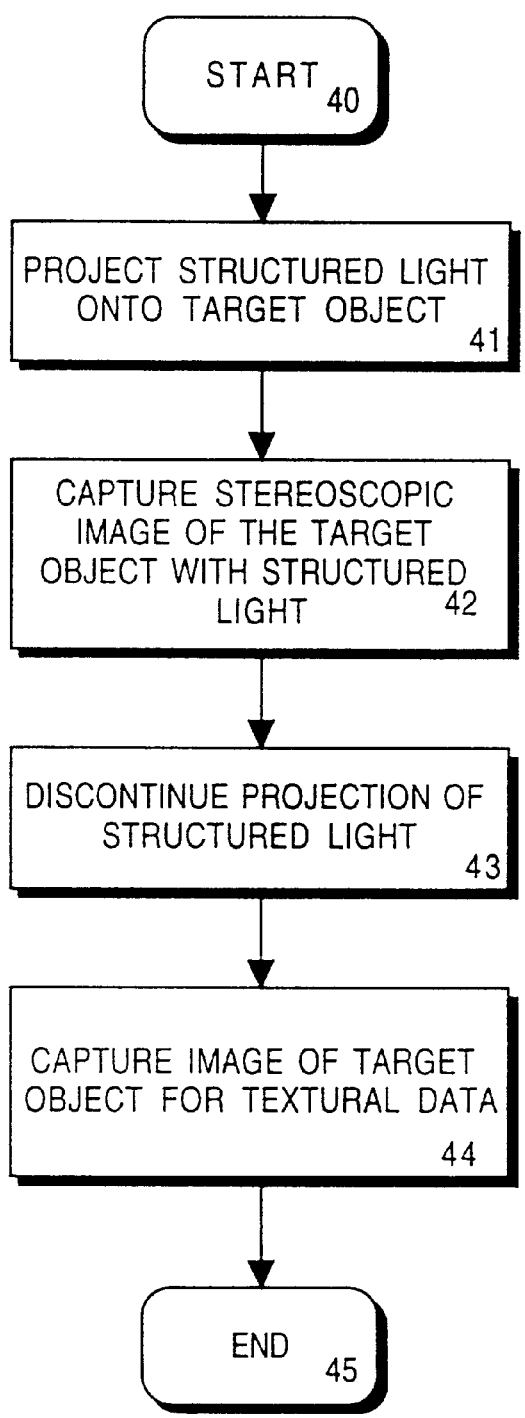
FIG. 4 illustrates an exemplary method of capturing structural light data of a target object using visible light source and textural data.

One embodiment of the light source 16 may be a laser emitter. The light source 16 and the diffracting device 17 may project a laser light, for example, vertical lines onto the target object. The description of the vertical lines should by no means be interpreted as limiting the scope of the invention. For example, horizontal lines may be used depending on the orientation of the cameras. Furthermore, it may be a grid of dots or segmented lines, etc. FIG. 4 illustrates one example of capturing a stereoscopic image of a target object using visible light source, and textural data. Block 41 illustrates a structured light projected onto the target object by a light source 16. With the structured light projected, block 42 illustrates a stereoscopic image of the object captured by the left 12 and right imaging devices 13 of the 3-D imaging device system 10. Once the stereoscopic image of the object with a structured light (i.e. structural light data) is captured, block 43 illustrates the light source 16 is switched off. Block 44 illustrates simultaneously or as close to simultaneously as possible, an image is captured by one of the left imaging device 12 and right imaging device 13 to obtain the textural data. Although multiple images may be taken by the left 12 and right imaging devices 13 to obtain textural data, generally, a single image from one imaging device may be sufficient. The reason for the simultaneousness is to match as closely as possible the stereoscopic image with the structural light data to the image with textural data. It should, however, be noted that where the 3-D imaging device system 10 and the target object are relatively stationary, simultaneousness is no longer important. Furthermore, in one embodiment, the textural data may be independent to the stereoscopic image, for example, where the textural data may be computer generated using conventional methods, textural image is not required.

In another embodiment, light source 16 may emit light in the infra-red region (generally considered to be light with wavelength longer than 780 nm). In this instance, the image sensor 14, 15 of the imaging device 12, 13 may be designed to enable simultaneous capture of the visible light textural data and infra-red structured light data. The image sensors 14, 15 may be equipped to simultaneously capture visible and infra-red light through appropriate use of color filters. As an example, an image sensor comprising a 2×2 square pattern of red, green, blue (RGB) and infra-red (IR) pixels may be created using existing commercial Color Filter Array (CFA) materials, taking advantage of the fact that these materials are transparent to IR radiation. By a simple overlay of two CFA colors (e.g. R, B) that have no overlapping transmittance in the visible portion of the spectrum, it is possible to create a composite filter element which blocks the visible light and transmits only IR. If two filters are used to form the composite filter, then each of the two filters has a visible radiation pass spectrum that is disjoint from the other, so that there is substantially no transmittance of visible light through the resulting composite filter formed from the combination of the two filters. If more than two filters are used, then each filter has a visible radiation pass spectrum such that the resulting composite filter is substantially opaque to visible light. This composite filter element is thus an IR pass filter, because each of the component filters used to form the composite filter is substantially transparent to IR. The deposition of the CFAs are accomplished by photo-lithographic techniques well known to the semiconductor industry. Further information on RGB and IR image sensor may be found in a pending application titled "Infrared Pixel Sensor and Infrared Signal Correction", Ser. No. 09/041,976, filed on Mar. 13, 1998.

Figure 5:
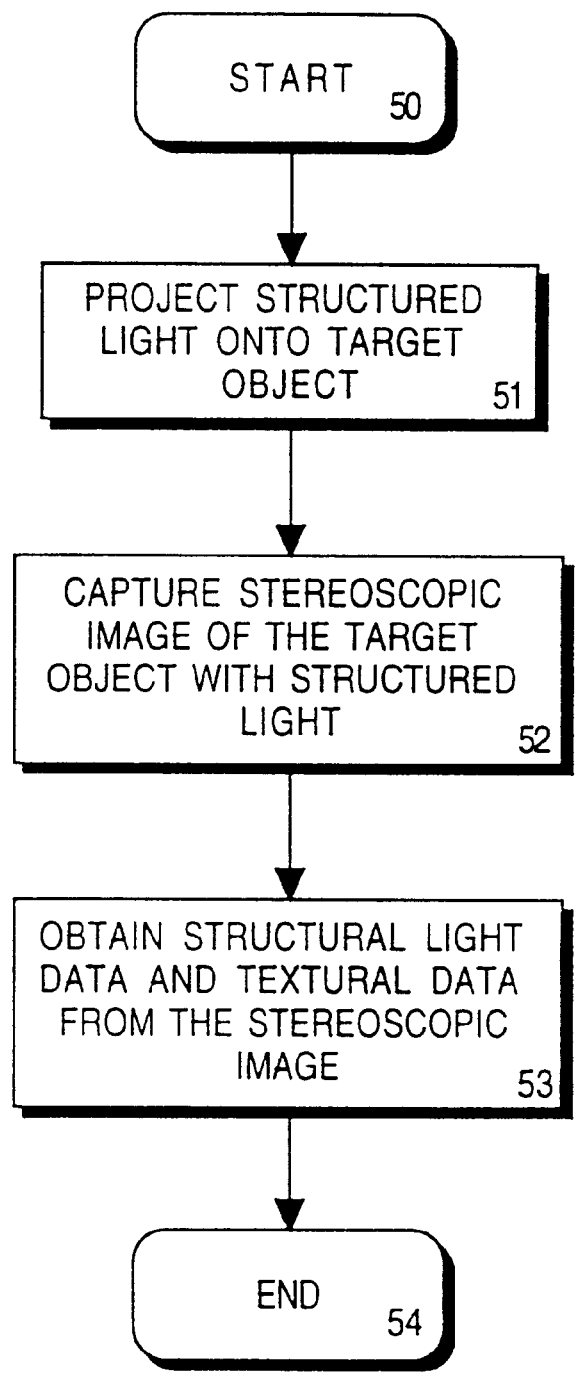
FIG. 5 illustrates an exemplary method of capturing structural light data of a target object using non-visible light source and textural data.

FIG. 5 illustrates one example of capturing structural light data of a target object using non-visible light source, and textural data. Block 51 illustrates the non-visible light source projecting a structured light onto the target object. Block 52 illustrates a stereoscopic image taken by the left imaging device 12 and right imaging device 13. Block 53 illustrates at least one of the imaging devices 12, 13 generating color outputs (e.g. red, blue, green) for textural data and both imaging devices 12, 13 generating non-visible light output (e.g. infra-red) for processing of structural light data.

In another embodiment, the imaging device system 10 comprises a combination of monochrome imaging devices such as black and white imaging devices and color imaging devices. Generally, where color imaging devices are used to capture both the textural data and the structured light data of the target object, the resolution of the structured light data is compromised. This arises from color generally being defined by three or more pixels (e.g. red, green and blue) that is also used to define a point in the feature, hence, positional information is spread over a group of pixels. By using one pixel to define one point position in the feature, higher resolution may be obtained. In using monochrome imaging devices to capture positional information of the features, a higher degree of accuracy may be achieved.

Figure 2:
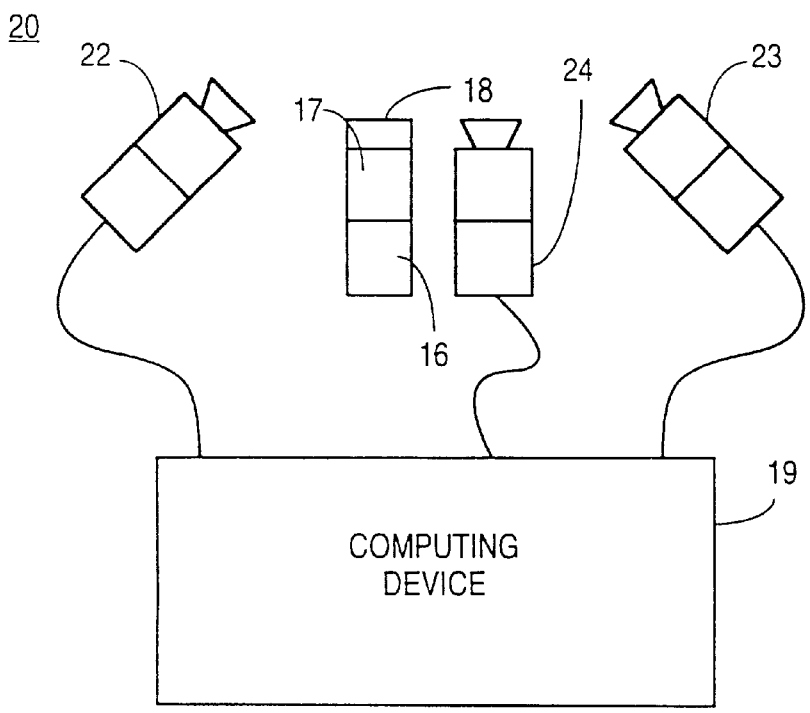
FIG. 2 illustrates another exemplary 3-D imaging device system.

FIG. 2 illustrates an embodiment of the 3-D imaging device system described above. The 3-D imaging device system 20 may comprise a pair of monochrome imaging devices designated here as a left monochrome imaging device 22 and right monochrome imaging device 23. The pair of monochrome imaging devices 22, 23 capture a stereoscopic image of a target object that comprises structural light data of the object. The structured light is produced by a light source 16 and a diffracting device 17 in a manner described previously. Where coding of the structured light is desired, an appropriate filter 18 may be coupled with the diffracting device 17. The 3-D imaging device system 20 further comprises a color imaging device 24 that captures the textural data of the target object. When textural data is to be obtained, the light source 16 is prevented from emitting structured light if the light is in the visible spectrum. However, if the light is in the non-visible spectrum, the monochrome imaging devices 22, 23 and the color imaging device 24 may take an image of the target object simultaneously. In this instance the monochrome imaging devices should be adaptable to capture structural light data produced by the light in the non-visible spectrum. As an example, where the non-visible light source is an infra-red light emitter as described previously, the monochrome imaging devices may be an infra-red imaging device. It should be noted that all three imaging devices 22, 23, 24 should be calibrated with respect to a chosen coordinate system such that the captured positional information obtained by the monochrome imaging devices 22, 23 may be combined with the textural data of the color imaging device 24 to form a 3-D model with high degree of resolution. Before any stereoscopic images are taken, all imaging devices in a 3-D imaging device system should be calibrated which will be apparent with the description below.

Referring to FIG. 1 as an example, calibration is performed on imaging devices 12 and 13 to determine each position and orientation of the imaging devices before any stereoscopic images are captured. By performing calibration, the imaging devices are placed in a chosen coordinate system to be described further below that allows the computing device used to create the 3-D data to know the relative position of the imaging devices in the chosen coordinate system. With the position of the imaging devices known, features of the captured stereoscopic images may be correlated together to form a combined input in order to form the 3-D data for 3-D modeling. To illustrate this point, imagine two imaging devices in 3-D space taking an image of the same object to form a left image and a right image of the object which is the stereoscopic image of the object. Due to the differences in the two images, stereoscopic matching can take place. Stereoscopic matching is a process where a point feature in one image is matched with the corresponding point feature in the other image. While the human visual system can readily detect the various features of the left image and the right image, and correlate the two images together, a computing device performing a similar function would need to define the various features in terms of coordinates in a coordinate system. The relevant information from this activity is the set of coordinates for each image which determines the location of the features in the image. The coordinate set of these features in all images, together with the position of the imaging devices with which each image was taken can then be used to determine the original location in 3-D space of the identified feature.

Figure 6:
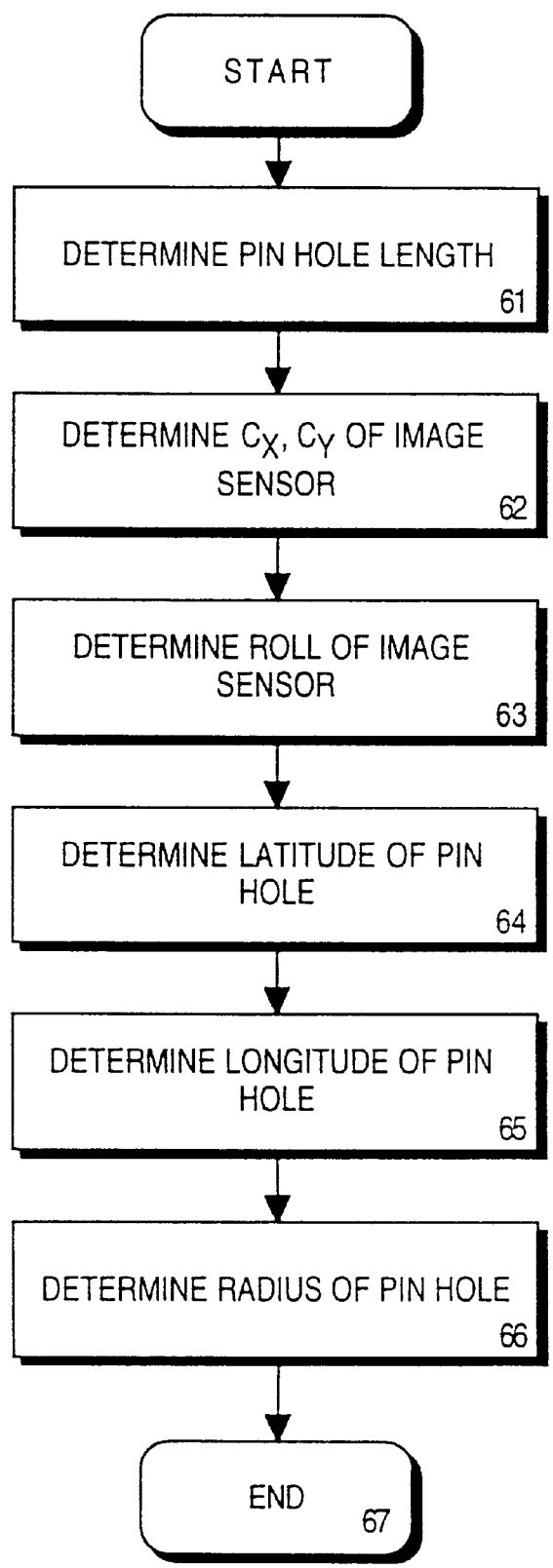
FIG. 6 illustrates an exemplary calibration procedure.
Figure 7:
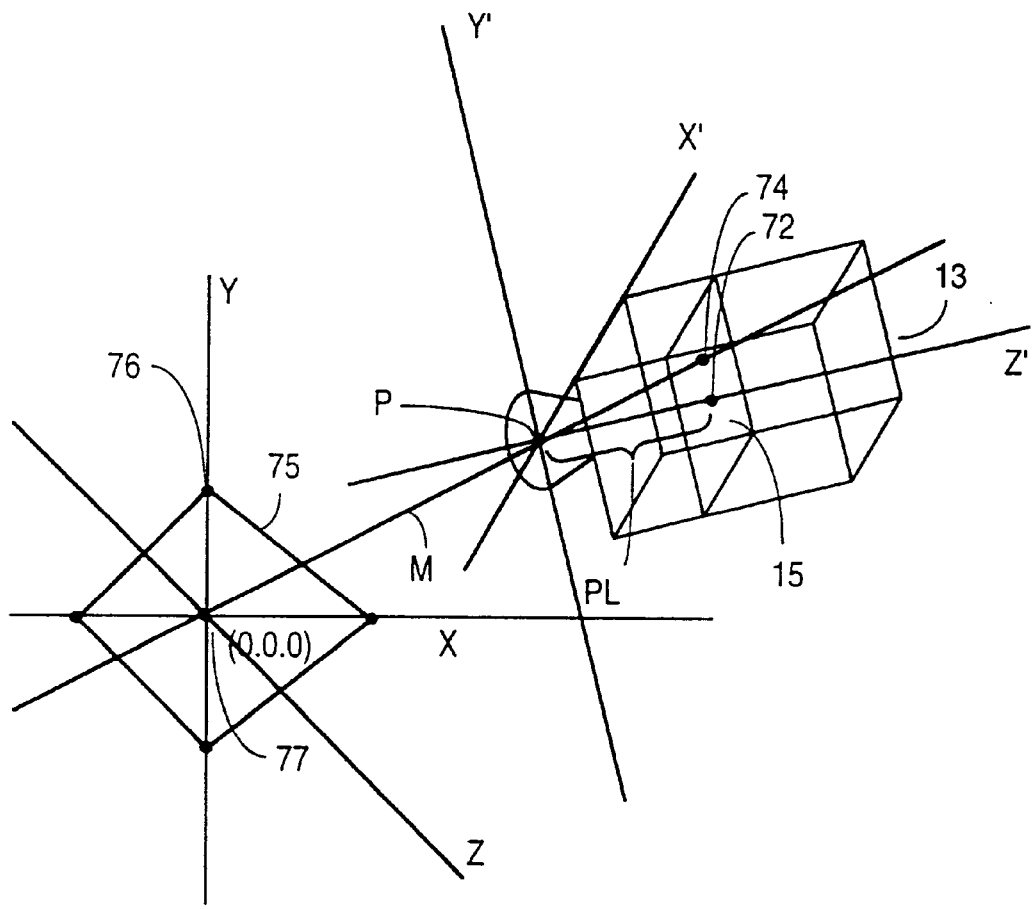
FIG. 7 illustrates an imaging device to be calibrated according to a chosen coordinate system.

FIG. 6 illustrates one embodiment of performing calibration. For calibration purposes, a total of at least six positional values may be required for a complete description of the position and orientation of an imaging device with respect to a chosen coordinate system. It should be noted that the positional values are determined for each imaging device in the 3-D imaging device system. In one embodiment, the imaging device may be defined as an image sensor 15 with a pin hole P projecting from the center and normal to the image sensor 15 at a predetermined length (i.e. pin hole length to be described further below) as illustrated in FIG. 7. A pin hole of an imaging device is a fictitious point in space located a fixed distance from and normal to the center of the image sensor where all the incident light corresponding to an image enters the imaging device to project the image on the image sensor. The position of the imaging device may be determined by the position of the pin hole in the chosen coordinate system. In one embodiment, the chosen coordinate system may be a Cartesian coordinate system with the origin and X, Y, Z, axis designated arbitrarily, thus, three of the positional values may be X, Y, Z, corresponding to the position of the pin hole in the chosen coordinate system. In another embodiment, polar coordinate system may be used and similarly the origin and radius, latitude angle, longitude angle reference are designated arbitrarily, thus, the position of the pin hole may be defined in radius, longitude angle, and latitude angle in the chosen coordinate system.

The orientation of the imaging device may be determined by the orientation of the image sensor with respect to the chosen coordinate system. In determining the orientation of the image sensor, each imaging device may be designated an imaging device coordinate system. For example, the origin of the imaging device coordinate system may be the pin hole of the imaging device. The Z'-axis of the imaging device coordinate system may be the axis passing through the pin hole and the center of the image sensor. The X'-axis and the Y'-axis of the imaging device coordinate system may be parallel to a horizontal and vertical side of the image sensor respectively. One skilled in the art will recognize that different origin and orientation of the axis may be used for the imaging device coordinate system. In one embodiment, a polar coordinate system may be used where initially, an imaging device to be calibrated may be placed in an orientation in the chosen coordinate system where the pin hole may lie at the origin of the chosen coordinate system and the center of the image sensor may lie at the Z-axis of the chosen coordinate system, the image sensor intersecting the Z-axis at a distance of a pin hole length. The X'-axis and the Y'-axis of the image sensor may be parallel with the X-axis and Y-axis of the chosen coordinate system respectively. When the pin hole is moved in radius, longitude angle, latitude angle to its actual position in the chosen coordinate system, the image sensor would also move from its initial orientation to a known orientation designated as reference orientation in the chosen coordinate system. The actual orientation of the image sensor may be measured as a deviation from the reference orientation. In one embodiment, the deviation may be determined through the remaining three positional values that correspond to Cx, Cy and roll which will be described with more detail further below. Note that the orientation is such that the image plane center is on the axis formed by the origin of the chosen coordinate system and the pin hole location as described above.

In one embodiment, a calibration target may be used to determine the position and orientation of the imaging device in a chosen coordinate system. For illustration purposes, the polar coordinate system is used. An exemplary calibration target 75 comprising a diamond represented by a dot on each corner 76 and the center 77, totaling five dots as illustrated in FIG. 8a may be used. However, it will be apparent to one skilled in the art that other configurations and shapes may be used to achieve a desired result. Note that a calibration target may be a drawing or sets of points on a piece of paper or it may be an actual object. If an actual object is used, the object should have features that may be used as reference points. As an example, a face of a cube may be used as a calibration object using the corners of the face as reference points with perhaps, another reference point defined at the center by the intersection of two diagonal imaginary lines, each line connecting two corners of the face.

Referring back to FIG. 7, the coordinate of the pin hole P of the imaging device 13 may be defined according to a chosen coordinate system the origin of which, for example, may be the center of the calibration target 75 and having a X-axis that may be horizontal to the calibration target, Y-axis that may be vertical to the calibration target, and Z-axis that may be normal to the calibration target as illustrated. It should noted that the chosen coordinate system should be the same for all imaging devices to be calibrated in a 3-D imaging device system so that each imaging device would have a common chosen coordinate system. The coordinate of the pin hole P may be defined in Radius, Latitude angle, Longitude angle, corresponding to three positional values with respect to the center dot 77 of the calibration target 75. Radius, latitude angle, and longitude angle can readily be produced from the description of the position in the cartesian coordinate system defined by the X, Y, and Z axis which is conventional.

The orientation of the image sensor 15 may be determined by its center 72 with respect to an axis M defined by the center dot 77 of the calibration target 75 and the coordinate of the pin hole P. The center dot 77 of the calibration target 75 which lies on the axis M will be imaged at the image sensor 15 representing the deviation 74 from the center 72 of the image sensor 15 with respect to the axis M. From the deviation 74, the center 72 of the image sensor 15 may be aligned with the axis M by rotating the image sensor 15 about the X'-axis (Cx) and the Y'-axis (Cy) with respect to the pin hole P in the imaging device coordinate system described above until center 72 corresponds to the location of deviation 74. The angular values of Cx and Cy corresponds to two of the remaining positional values. The roll of the image sensor 15 defines the rotational orientation of the image sensor 15 in the Z'-axis in the imaging device coordinate system. Roll is compensated for by rotating the image sensor 15 along the Z'-axis until the Y-axis of the coordinate is parallel with the Y'-axis of the image sensor from the image sensor's perspective, for example. The angular value of the roll corresponds to the last remaining positional value.

It should be noted that the exemplary six positional values may be dictated according to the sequence in which the values are applied. In other words, positional values for one sequence may not be interchangeable with positional values for another sequence. For example, positional values obtained for the sequence: Cx, Cy, roll, latitude, longitude, radius may be different from positional values obtained for the sequence: roll, Cx, Cy, longitude, latitude, radius. Hence, positional values are identified with the sequence of the positional values taken.

Figure 9:
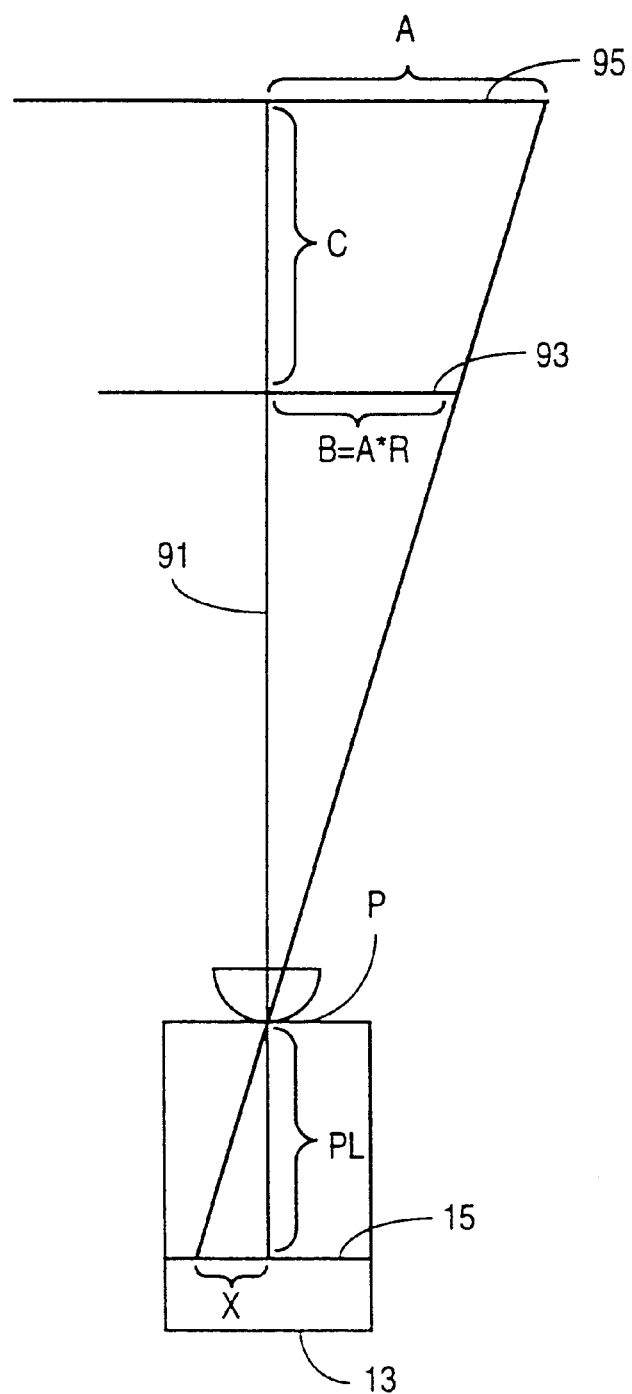
FIG. 9 is an exemplary instrument to determine a pin hole length of an imaging device to be calibrated.

Referring back to FIG. 6, it should be noted that the sequence illustrated should by no means be construed as a limitation and one skilled in the art will recognize that other sequences may be used. Block 61 illustrates determining the pin hole length which is the length distance of the pin hole perpendicular and center to the image sensor. The pin hole length for each imaging device in the 3-D imaging device system should be determined. The pin hole length (sometimes known as focal point length) is generally given in the manufacturer's specification of the imaging device. To obtain a more accurate pin hole length for the individual imaging devices, the following instrument may be used as illustrated in FIG. 9.

The accuracy of the pin hole length PL is important in that from the pin hole length, sampled points of a target object may be translated to a coordinate on the image sensor. For illustration purposes, the right imaging device 13 is used. The pin hole length PL of the imaging device 13 may be determined by placing the imaging device 13 on a rail 91 which has two rectangles 93, 95 that slide back and forth along the axis of the rail 91. Let the two rectangles 93, 95 be designated first rectangle 93 and second rectangle 95. Furthermore, at least one of the defining length of a rectangle (commonly referred to as horizontal or vertical length) should be known for each rectangle. In this example, the horizontal half length of the second rectangle 95 is known which is A and the horizontal half length of the first rectangle 93 is known which is B. The horizontal half length B should be made smaller than the horizontal half length A. The ratio R is then the ratio of horizontal half length B over horizontal half length A. Both rectangles should be mounted such that the center line of the rail 91 is normal to the two rectangles. Furthermore, the center of the rectangles 93, 95 should coincide with the center of the rail 91. The first rectangle 93 and the second rectangle 95 should further be parallel to each other. First rectangle 93 must furthermore be slidable and at all times comply with the requirements outlined above. By sliding the first rectangle 93 in the direction of the imaging device 13, while the second rectangle 95 remains stationary, at a certain distance on the rail 91, from the image sensor's 15 perspective, the projection of the rectangles' defining lengths will coincide on the image sensor. At this point, the image of horizontal length B of the first rectangle 93 and the image of horizontal length A of the second rectangle 95 passes through the pin hole P to project a same length X on the same location of the image sensor 15 as illustrated in FIG. 6. Knowing the distance between the first rectangle 93 and second rectangle 95 which is C measured on the rail 91, and the length of the projection on the image sensor measured by X, the pin hole length PL may be defined by the formula $$PL = X*C/(A*(1-R))$$

Generally, the measurement inside the imaging device is determined in pixel units. Note that pin hole length PL obtains its dimension from projection X. Since projection X is measured in pixel units, pin hole length PL is also measured in pixel units which is adequate in practice.

Referring back to FIG. 6, block 62 illustrates determining Cx and Cy of the image sensor. FIG. 8b illustrates an image of the calibration target 75 captured by an image sensor 15. From the captured image, image sensor 15 is computationally moved so that the center 72 of the image sensor coincides with the imaged center 77 of the calibration target 75. The movement in pixel units in the X'-axis and in the Y'-axis with respect to the imaging device coordinate corresponds to the Cx and Cy respectively. Alternatively, because the pin hole length is known as described previously, Cx and Cy may be also defined in terms of the angular rotation in the X'-axis and Y'-axis with respect to the pin hole P. When the target center 77 coincides with the center 72 of the image sensor 15, the center of the image is aligned with axis M (see FIG. 7) passing through the pin hole and the origin of the chosen coordinate system. Through Cx and Cy, the orientation of the image sensor 15 may be determined with respect to axis M and the pin hole P. As the calibration target 77 is relocated to the center 72 of the image sensor 15 from the image sensor's perspective, the corner dots 76 representing the calibration target are also computationally moved to represent the view from the image sensor in its new position. The relocated calibration target is illustrated by FIG. 8c.

Below is an exemplary fragmented program in Visual Basic that illustrates the above description.

For the example, the following definitions are required:

VERTEX2D is describing one point of an image. Its relevant members are the x and y coordinate (i.e. dx, dy);

VTXLIST2D is a list of VERTEX2D objects with associated housekeeping storage (i.e. calibration target where member 0 is center point, member 1 is top point, member 2 is bottom point, member 3 is left point, member 4 is right point);

VERTEX3D is describing one point in 3D space. Its relevant members are the x, y, and z coordinates (dx, dy, dz); and VTXLIST3D is a list of VERTEX3D objects.

```
Public Sub gs_UndoCoxCoyWjm(InVec As VTXLIST2D, res As VTXLIST2D, Coff As VERTEX2D)
    'the offsets are returned in Coff
    Dim v1 As VERTEX3D
    Dim v2 As VERTEX3D
    Dim v3 As VERTEX3D
    Dim vtx2tmp1 As VERTEX2D
    Dim vRot As VERTEX3D
    Dim dCosAngle As Double
    Dim dAngle As Double
    Dim i As Integer
    'figure out the x and y offsets
    Coff.dx=v2.dx
    Coff.dy=v2.dy
    'work to simulate the effect of un-doing the off-center of the imaging device
```

```
'get the normal and rotation angle
v1.dx=0
v1.dy=0
v1.dz=f2_dCAMF
v2.dx=InVec.vx2A(O).dx
v2.dy=InVec.vx2A(O).dy
v2.dz=f2_dCAMF
Call gs_CosAngle3(v1, v2, dCosAngle) 'get the cosine
```
of angle between v1 and v2
```
Call gs_ArcCos(dCosAngle, dAngle) 'get the angle from
```
the cosine
```
Call gs_orth3(v1, v2, vRot) 'get an orthogonal vector to
```
the plane spanned by v1 and v2. That is the vector around which the picture has to be rotated to bring the center point into the center of the image plane.
```
    'rotate all vectors in the target vertices list to undo the Cx
```
and Cy effect
```
    For i=0 To InVec.lNumVertex-1
    v1.dx=InVec.vx2A(i).dx
    v1.dy =InVec.vx2A(i).dy
    v1.dz =dCAMF 'dCAMF is the distance from the image
```
sensor to the pin hole locations (in pixels)
```
    Call gs_rot3dVec(dAngle, vRot, v1, v2)
    Call gs_project3Planar(f2_dCAMF, v2, v3)
    res.vx2A(i).dx=v3.dx
    res.vx2A(i).dy=v3.dy
    res.vx2A(i).bFlag=True
    Next i
End Sub
```

Block 63 of FIG. 6 illustrates determining the roll of the image sensor. The roll is the rotation of the image sensor around the Z'-axis of the imaging device coordinate system, in this instance, the Z'-axis corresponding to the axis M passing through the pin hole P and the center 72 of the image sensor 15. Referring to FIG. 8c, once the image sensor is relocated so that the image sensor center 72 coincides with target center 77, the projection of the Y-axis of the target 75 onto the image sensor is compared with a Y'-axis passing through the center and parallel to vertical sides of the image sensor 15 from the image sensor's perspective. The angle deviation between the Y-axis and the Y'-axis is the roll of the image sensor. The roll is compensated for by computationally rotating the image sensor along the axis M until the Y-axis of the calibration target is parallel with the Y'-axis of the image sensor. As the roll is compensated, the corner dots representing the calibration target are also computationally moved to represent the view from the image sensor's perspective due to the roll compensation. The roll compensated calibration target 75 is illustrated by FIG. 8d.

Below is an exemplary program in Visual Basic that illustrates the description above:
```
Public Sub gs_UndoRollWjm(src As VTXLIST2D, res
As VTXLIST2D, dTwist As Double) 'dTwist is the detected
roll angle'
    'undo the roll after the imaging device orientation has
been corrected for Cx, Cy
    Dim dalpha1 As Double
    Dim dalpha2 As Double
    Dim dAlpha As Double
    Dim v1 As VERTEX3D
    Dim v2 As VERTEX3D
    Dim i As Integer
    'rotation around the z axis with angle defined by atn x/y
    dalpha1=Atn(src.vx2A(l).dx/srcvx2A(l).dy)
    dalpha2=Atn(src.vx2A(2).dx/src.vx2A(2).dy)
    dAlpha=(dalphal+dalpha2)/2 'take arithmetic mean
    dTwist=-dAlpha * 190/const_PI
    'simulate undoing the roll on the five calibration points of
the image
    For i=LBound(src.vx2A) To UBound(src.vx2A)
    v1.dx=src.vx2A(i).dx
    v1.dy=src.vx2A(i).dy
    v1.dz=0
    Call gs_rot3dZ(dAlpha, v1, v2)
    res.vx2A(i).dx=v2.dx
    res.vx2A(i).dy=v2.dy
    Next i
End Sub
```

Block 64 of FIG. 6 illustrates determining the latitude position of the pin hole. Latitude determines the vertical position of the pin hole with respect to the calibration target. The latitude of the pin hole is determined by the length between the top and center dot and the length between the bottom and the center dot of the calibration target. The image sensor is computationally moved radially around the center point of the calibration target in a plane defined by the Y-axis and the pin hole location. The orientation of the imaging device maintains the condition that the center of the image sensor remains on the axis defined by the center of the calibration target and the relocating pin hole. The image sensor is moved until the length between the top and center dot and the length between the bottom and center dot are equal as viewed by the image sensor. At this point, the pin hole has computationally been moved into the X-Z plane and the angle the image sensor has computationally moved is the latitude. The corner dots representing the calibration target are computationally transformed to represent the view from the image sensor's perspective due to the positional change of the image sensor.

Below is an exemplary program in Visual Basic that illustrates the description above:
```
Public Sub gs_UndoLatitudeWjm(src As VTXLIST2D,
res As VTXLIST3D, proj As VTXLIST2D, dLatitude As
Double)
    'Find out the latitude through comparison of the angles
from midpoint in both
    'directions of y
    Dim dm1 As Double
    Dim dm2 As Double
    Dim dm3 As Double
    Dim v1 As VERTEX3D
    Dim v2 As VERTEX3D
    Dim v3 As VERTEX3D
    Dim v4 As VERTEX3D
    Dim i As Integer
    Dim dAlpha As Double
    dm1=src.vx2A(1).dy/f2_dCAMF
    dm2=src.vx2A(2).dy/f2_dCAMF
    If Abs(dm1+dm2) >0.000000000001 Then
    dm3=2 * dm1 * dm2/(dm1+dm2)
    dAlpha=Atn(dm3)—const_PI/2
    Else
    dm3=1E+100
    dAlpha=0
    End If
    'range of dalpha is –90 to +90 deg
    If dAlpha <-const_PI/2 Then
    dAlpha=dAlpha +const_PI
    End If
    dLatitude=dAlpha * 190 1 const_PI
    Dim vpLatVec As VERTEX3D
    Dim vp1 As VERTEX3D
    Dim vp2 As VERTEX3D
    Dim vp3 As VERTEX3D
```

```
Dim vp4 As VERTEX3D
Dim vp5 As VERTEX3D
Dim vl1 As VERTEX3D
Dim vl2 As VERTEX3D
Dim vPt As VERTEX3D
'correct the display:
'create a vector which is tilted into the direction of the latitude
vpLatVec.dx=0
vpLatVec.dy=Cos(dAlpha)
vpLatVec.dz=Sin(dAlpha)
vp1.dx=0
vp1.dy=0
vp1.dz=0
Call gs__vec3ToNormalPlane(vpLatVec, vp2, vp3)
vp4.dx=1
vp4.dy=0
vp4.dz=0
vp5.dx=vpLatVec.dx
vp5.dy=vpLatVec.dy
vp5.dz=vpLatVec.dz
'shift the plane from the pin hole to the center of the ccd
vp1.dz=vp1.dz—f2__dCAMF
vp2.dz=vp2.dz—f2__dCAMF
vp3.dz=vp3.dz—f2__dCAMF
vp4.dz=vp4.dz—f2__dCAMF
vp5.dz=vp5.dz—f2__dCAMF
vl1.dx=0
vl1.dy=0
vl1.dz=0
res.vx3A(0).dx=src.vx2A(0).dx
res.vx3A(0).dy=src.vx2A(0).dy
res.vx3A(0).dz=—f2__dCAMF
'simulate un-doing the latitude
For i=1 To 4
vl2.dx=src.vx2A(i).dx
vl2.dy=src.vx2A(i).dy
vl2.dz=-f2__dCAMF
If i <3 Then
Call gf__bPlaneLineIntersection(vp1, vp4, vp5, vl1, vl2, vPt)
Else
Call gf__bPlaneLineIntersection(vp1, vp2, vp3, vl1, vl2, vPt)
End If
'rotate around the x axis
vPt.dz=vPt.dz +f2__dCAMF
Call gs__rot3dX(-dAlpha, vPt, v3)
'shift everything back by the f distance
v3.dz=v3.dz—f2__dCAMF
res.vx3A(i)=v3
'project into the image sensor plane
Call gs__project3Planar(-f2__dCAMF, v3, v4)
proj.vx2A(i).dx=v4.dx
proj.vx2A(i).dy=v4.dy
Next i
End Sub
```

Block 65 of FIG. 6 illustrates determining longitude position of the pin hole. Longitude determines the position of the pin hole in the X-axis with respect to the chosen coordinate system. Longitude is determined by the length between the left dot and the center dot and the length between the right dot and the center dot of the calibration target as imaged in the image sensor. The image sensor is computationally moved radially around the calibration target in the X–Z plane. The orientation of the imaging device is changed so that the center of the image sensor remains on the axis defined by the center of the calibration target and the relocating pin hole. The image sensor is moved until the length between the left dot and the center dot is equal to the length between the right dot and the center dot as viewed by the image sensor. At this point, the angle the pin hole has moved is the longitude. The corner dots representing the calibration target are computationally transformed to represent the view from the image sensor's perspective due to the positional change of the image sensor.

Below is an exemplary program in Visual Basic that illustrates the description above:

```
Public Sub gs__UndoLongitudeWjm(src As VTXLIST3D, res As VTXLIST3D, proj As VTXLIST2D, dLongitude As Double)
'Find out the longitude through comparison of the angles from midpoint in both
'directions of x
Dim dm1 As Double
Dim dm2 As Double
Dim dm3 As Double
Dim v1 As VERTEX3D
Dim v2 As VERTEX3D
Dim v3 As VERTEX3D
Dim v4 As VERTEX3D
Dim i As Integer
Dim dA As Double
Dim dAlpha As Double
'first get the projection of point 3 into the yz plane
Call gs__project3Planar(-f2__dCAMF, src.vx3A(3), v1)
Call gs__project3Planar(-f2__dCAMF, src.vx3A(4), v2)
'next find out what angle we have from 0 point to point 3
'in the xz plane
dm1=v1.dx /v1.dz
dm2=v2.dx /v2.dz
If Abs(dm1 +dm2) >0.000001 Then
dm3=2 * dm1 * dm2/(dm1+dm2)
Else
dm3=1000000
End If
dAlpha=const__PI/2—Atn(dm3)
If dAlpha >const__PI/2 Then dAlpha=dAlpha—const__PI
dLongitude=dAlpha * 190 1 const__PI
'simulate undoing of longitude
For i=0 To 4
v2=src.vx3A(i)
'simulate shift into the pin hole plane, by making z 0
v2.dz=v2.dz +f2__dCAMF
'rotate around the y axis
Call gs__rot3dY(dAlpha, v2, v3)
'shift everything back by the f distance
v3.dz=v3.dz—f2__dCAMF
res.vx3A(i)=v3
'project into the image sensor plane
Call gs__project3Planar(-f2__dCAMF, v3, v4)
proj.vx2A(i).dx=v4.dx
proj.vx2A(i).dy=v4.dy
Next i
End Sub
```

Block 66 of FIG. 6 illustrates determining the radius of the pin hole. Radius is the distance between the pin hole and the origin of the chosen coordinate system. Radius may be determined, for example, in the following manner. From the calibration target, the distance between the corner dot and the center dot of the calibration target is known. From the image sensor, the imaged corner dot and the center dot of the calibration target may be measured in pixels. Because the pin hole length is known, the radius may be defined by the formula Radius=PL*(A'/X')

where A' is the distance between a corner dot and a center dot of the calibration target and X' is the imaged distance of the corner dot and the center dot at the image sensor.

Below is an exemplary program in Visual Basic that illustrates the description above:

Public Sub gs_DetermineDistanceWjm(src As VTXLIST3D, res As VTXLIST3D, proj As VTXLIST2D, dDistance As Double)
res=src
End Sub In the instances where the change in the lengths corresponding to the relative dots in the calibration target 75 are relatively minor, it is desirable to install an additional calibration dot that is protruding from the plane where the calibration target 75 is located to be closer to the image sensor with respect to the remaining target dots 76, 77. Because the additional dot is closer to the image sensor, the dot is more susceptible to the change in the direction of the image sensor than the dots 76, 77 on the calibration target 75. FIG. 10 illustrates an exemplary calibration target 101 having a diamond shape with a dot 108 protruding normally from the plane of the calibration target 101. This is achieved by having a triangular plane protruding from the plane where the calibration target 101 is located as illustrated. The angle of the protrusion may be 45°. A calibration dot 108 is placed on the protruding triangle in a manner such that the dot 108 aligns with the left dot 102 and right dot 104 of the calibration target 101.

Referring back to the determination of the latitude of block 64 in FIG. 6, the image sensor having a latitude with respect to the calibration target 101 will detect the protruding dot 108 to be either above or below an X-axis passing through the left dot 102 and right dot 104 of the calibration target 101. The image sensor is computationally moved vertically until the dot 108 aligns with the left dot 102 and the right dot 104. At this point, the angular distance the pin hole has moved corresponds to the latitude. Turning to the determination of longitude of block 65 in FIG. 6, the image sensor having a longitude with respect to the calibration target 101 will detect the protruding dot 108 to be at a distance from the calibration target 101. As an example, the ratio corresponding to the distance between the protruding dot 108 and the right dot 104 in the plane where the calibration target 101 is located and the distance between the right dot 104 and the left dot 102 can be predetermined, thus, the ratio is computationally calculated as the image sensor is computationally moved horizontally until the predetermined ratio is reached. At this point, the angular distance the pin hole has moved corresponds to the longitude.

When the six positional values are known for each image sensor of the imaging devices in the 3-D imaging device system, the calibration is complete. The computing device used to create 3-D data is able to know the relative position of the image sensors in the chosen coordinate system by reverse sequencing the positional values obtained. For example, if the sequence taken is Cx, Cy, roll, latitude, longitude, radius, then the computing device by reverse sequencing, that is computing in the sequence, radius, longitude, latitude, roll, Cy, Cx, knows the position of the image sensor.

With the calibration performed on each of the imaging devices in the 3-D imaging device system and before stereoscopic images are taken by the imaging devices 12 and 13 as illustrated in FIG. 1, for example, initially, markers should be placed on the target object 20 that outline the contours or features of the object as illustrated in FIG. 3a. For example, vertical lines 21 may be evenly placed on object 20. However, it should be noted that more lines 21 may be added to object 20 in areas where there are fine features such as the eyes or the nose, for example. The vertical lines 21 may be painted onto the object 20 using fluorescent paint that is visible only in the dark such that structural data may be obtained in the dark. Alternatively, the paint used may be invisible in the visible spectrum but visible to radiation outside the visible spectrum such as infra-red or ultraviolet light. Alternatively, the vertical lines 21 may be projected onto the object 20 using light source 16 such as infra-red laser or visible laser. It will be appreciated that the description of vertical lines should by no means be interpreted as limiting the scope of the invention. For example, horizontal lines may be used depending on the orientation of the imaging devices 12 and 13. Furthermore, depending on the sophistication of the diffracting device 17, a grid of uniform dots may be projected onto the object.

Figure 11:
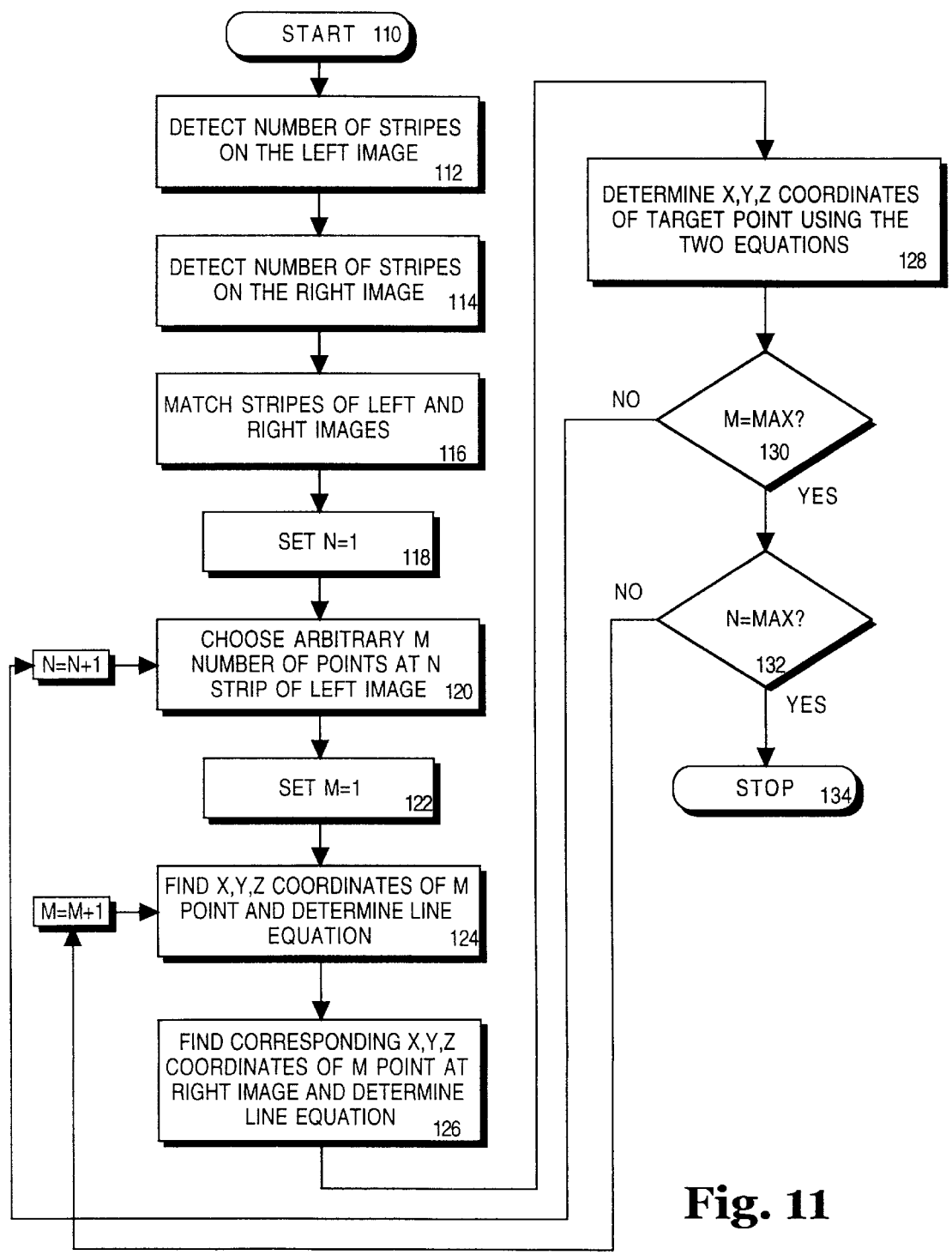
FIG. 11 illustrates an exemplary 3-D data extraction procedure from a stereoscopic image of an object.

Using structured light as an example to further the understanding of the invention, the light source 16 with the diffracting device 17 project a structured light, in this example, vertical lines onto the target object. With the structured light projected, a stereoscopic image of the object is captured by the left imaging device 12 and right imaging device 13 of the 3-D imaging device system 10. FIG. 11 is a flowchart of an embodiment illustrating the extraction of 3-D data from a stereoscopic image of an object comprising a left image and a right image. Block 112 illustrates determining the number of vertical lines detected by the right image sensor corresponding to the vertical lines projected onto the target object using structured light. Block 114 illustrates determining the number of vertical lines detected by the left image sensor also corresponding to the vertical lines projected onto the target object. Block 116 illustrates matching the vertical lines detected by the right image sensor with the vertical lines detected by the left image sensor in a correlating manner. Block 118 illustrates setting a first counter at 1 reflecting the first correlating vertical line detected at the right image sensor. Block 120 illustrates converting the correlating vertical line into a plurality of dots. Typically, the distance between the dots is measured in pixel units, for example, a dot from the vertical line may be formed per every five pixels. Note that by controlling the number of correlating vertical lines and the number of dots to be converted from each vertical line, a desired number of points in the 3-D data may be obtained. Block 122 illustrates determining the number of dots converted from the vertical line and setting a second counter at 1 reflecting the designated dot to be the first dot. Block 124 illustrates computing a "line of sight" originating from the designated dot and passing through the pin hole of the right imaging device to project the line in 3-D space. At a certain point in the line of sight, the coordinate unknown, the point will intersect with a vertical line in the target object that correlates with the vertical line from which the designated dot originated. The intersecting point at the target object will also correspond to the position of the designated dot in the right image sensor. In one embodiment, the line of sight for the right image sensor may be produced in the following manner.

Figure 12:
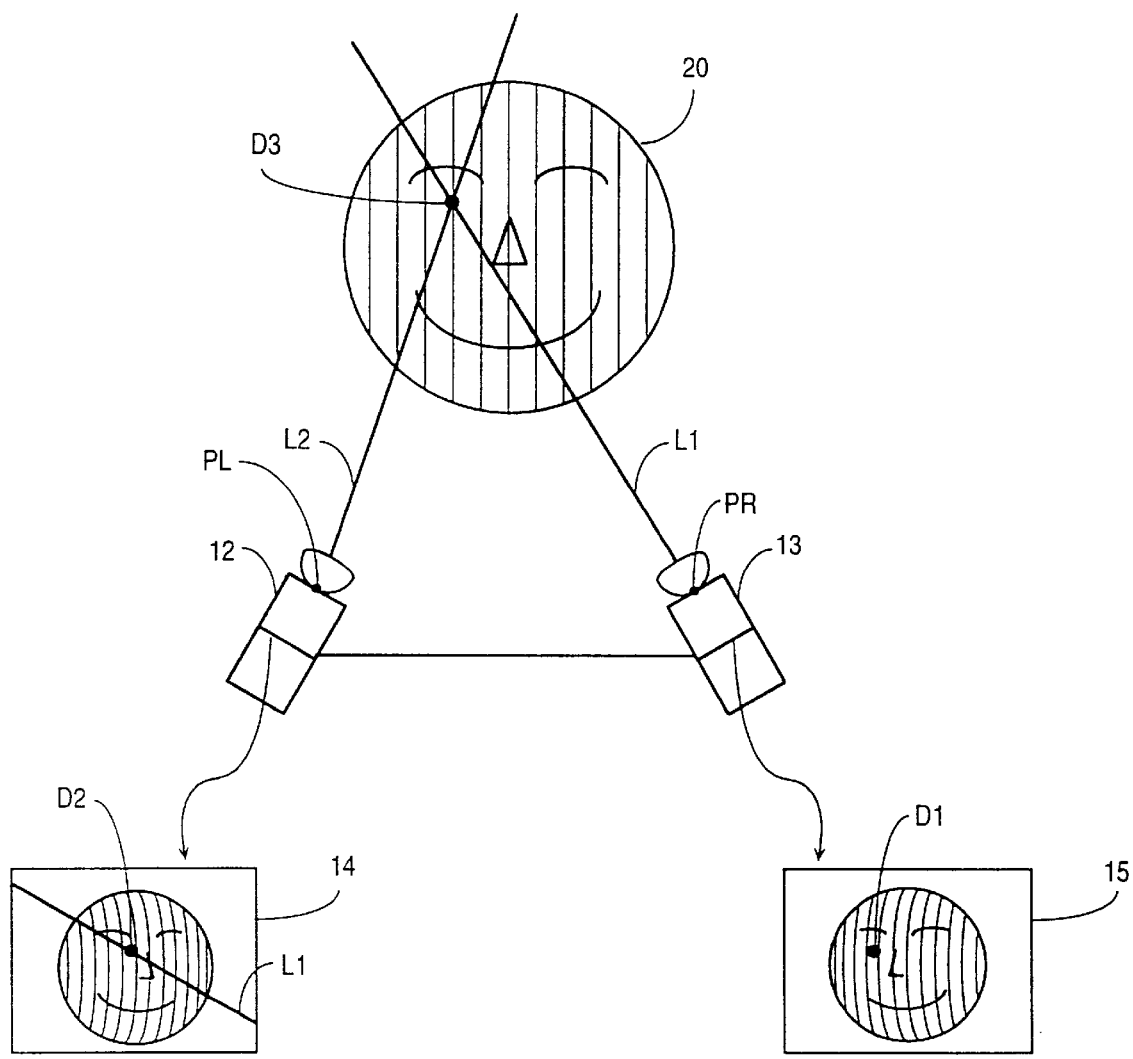
FIG. 12 illustrates another view of an exemplary 3-D data extraction procedure.

Referring to FIG. 7, the position of the pin hole P of the right imaging device 15 is known in the chosen coordinate system from the calibration of the right imaging device. Note that a pin hole P is positioned at a fixed distance PL from the center and normal to the image sensor. In this example, let the image sensor 15 comprise a 640×480 pixel array. However, one skilled in the art will recognize that other array sizes may also be used. Using pin hole P as the origin of an imaging device coordinate system, every point in the image sensor 15 may be referenced from the pin hole P in pixel values ($\Delta X'$, $\Delta Y'$, PL) where $\Delta X'$ is the deviation in the X'-axis of the position of the designated dot from the center of the image sensor 15, $\Delta Y'$ is the deviation in the Y'-axis of the position of the designated dot from the center of the image sensor 15, PL is a known fixed value which is a fixed distance in the Z'-axis, all three values measured in pixel units. Because the pin hole coordinate is known in the chosen coordinate system using this coordinate and values ($\Delta X'$, $\Delta Y'$, PL) corresponding to the designated dot, an equation corresponding to the line of sight for the designated dot may be produced. FIG. 12 illustrates a line of sight L1 representing the designated dot of the right image sensor 15.

Block 126 illustrates determining a point in the correlating vertical line of the left image sensor 14 that corresponds to the designated dot of the right image sensor 15. Once the corresponding point is determined, because the coordinate of the left pin hole is known in the chosen coordinate system through calibration, and the positional value of the point may be determined in the manner described immediately above, an equation representing the light of sight of the corresponding point may be obtained. FIG. 12 illustrates a line of sight L2 representing the corresponding point of the left image sensor 14. In one embodiment, the corresponding point in the left image 14 may be determined by "tracing" the line of sight L1 of the right image sensor 15 onto the left image sensor 14. Because the correlating vertical lines in the left and right image sensor corresponds to the same vertical line in the target object, the point of intersection of the line of sight from the right image sensor and the vertical line in the target object as viewed by the left image sensor would be the corresponding point of the designated dot to the right image sensor. An analogy will be used to explain block 126 to aid in the understanding of the procedure.

Assuming that the designated dot D1 in the vertical line imaged at the right image sensor 15 is able to emit a beam of light L1 that passes through right pin hole PR of the imaging device 13 and through space. The left imaging device 12 would be able to detect this beam of light L1 on its image sensor 14 from its field of view. The intersection of the detected beam of light L1 and the vertical line in the left image sensor 14 correlating with the vertical line in the right image sensor 15 from which the designated dot originated may be determined. The intersection point D2 would be the corresponding point of the designated dot D1 in the left image sensor. From the intersection point D2, a beam of light L2 may be projected that passes through the left pin hole PL of the left imaging sensor which should intersect with the beam of light L1. The point of intersection of the two beams of light L1 and L2 will be the X, Y, Z, coordinate in the chosen coordinate system of a point in the target object corresponding to the designated dot in the right image sensor which is one point of 3-D data of the target object. Of course, in reality, the above description is performed mathematically.

Below is an exemplary program written in Visual Basic to be used to illustrate a mathematical procedure performing the above description.

tc_MakeLineOfSight vx2A, ln3A, objA
'The first procedure above illustrates producing a right line of sight from the right image sensor where the coordinates of the right line of sight corresponds to the chosen coordinate system from calibration' tc_Ln3ObjMakeLn2 ln3A, ln2A, objB
'The second procedure above illustrates converting the right line of sight from the right image sensor in the chosen coordinate system to a left imaging device coordinate system. The right line of sight is traced onto the left image sensor'

If gf_bContourLineIntersection(ln2A, cn2B, vx2B)
'The third procedure above illustrates finding the intersection of the traced right line of sight on the left image sensor and the vertical line imaged at the left image sensor correlating with the vertical line on the right image sensor from which the right line of sight originated'

Call tc_MakeLineOfSight(Vx2B, ln3B, objB)
'The fourth procedure above illustrates producing a left line of sight from the left image sensor from the intersecting point and the coordinate of the left pin hole of the left imaging device in the chosen coordinate system'

If gf_bLineDistance3D(ln3A, ln3B, vx3A, dDist)=False
   Then 'result in vx3A
'The fifth procedure above illustrates finding the intersection of the right and left line of sights, wherein if the intersection does not occur, the point where the right line of sight is closest to the left line of sight is designated as the intersection point'

The subroutine below illustrates the first procedure in further details:
Public Sub tc_MakeLineOfSight(vx2In As VERTEX2D, ln3Out As LINE3D, obj2D
   As Object)
   Dim vx2A As VERTEX2D
   Dim dDist As Double
   dDist=50
   vx2A.dx=vx2In.dx—obj2D.f2_iCAMCx/2 'obj2D
'determines the center X'-axis of the image sensor'
   vx2A.dy=vx2In.dy—obj2D.f2_iCAMCy/2 'determines the center Y'-axis of the image sensor'
'Above two lines illustrate determining the center of the right image sensor and designating as coordinate (0, 0) in the right imaging device coordinate system'
   ln3Out.vx3A.dx=obj2D.f2_dLOSStart * vx2A.dx/obj2D.f2_dCAMF
   ln3Out.vx3A.dy=obj2D.f2_dLOSStart * vx2A.dy/obj2D.f2_dCAMF
   ln3Out.vx3A.dZ=-obj2D.f2_dLOSStart
'Above three lines illustrate designating a starting point for the right line of sight, the coordinate defined in the right imaging device coordinate system'
   ln3Out.vx3B.dx=obj2D.f2_dLOSEnd * vx2A.dx/obj2D.f2_dCAMF
   ln3Out.vx3B.dy=obj2D.f2_dLOSEnd * vx2A.dy/obj2D.f2_dCAMF
   ln3Out.vx3B.dZ=-obj2D.f2_dLOSEnd
'Above three lines illustrate designating an ending point for the right line of sight, the coordinate defined in the right imaging device coordinate system'
'Note the starting point and the ending point may be user defined so that the distance between the starting point and the ending point is sufficient to intersect the target object. As an example if the target object is 4 feet from the right image sensor, the starting point may be designated at 0.5 feet and the ending point may be designated at 6 feet'
   Call gs_XformCameraToWorld(ln3Out.vx3A, ln3Out.vx3A, obj2D)
   Call gs_XformCameraToWorld(ln3Out.vx3B, ln3Out.vx3B, obj2D)

'Transforming the coordinates of the starting point and the ending point from coordinates in the right imaging device coordinate system to coordinates in the chosen coordinate system'
End Sub
'The subroutine below illustrates converting points in the imaging device coordinate system to coordinates in the chosen coordinate system'
Public Sub gs_XformCameraToWorldWjm(vx3In As VERTEX3D, vx3Out As VERTEX3D, obj2D As Object)
    Dim v1 As VERTEX3D
    Dim v2 As VERTEX3D
    Dim vRot As VERTEX3D
    Dim dCosAngle As Double
    Dim dAngle As Double
    Dim dTwist As Double
    Dim dLongitude As Double
    Dim dLatitude As Double
    Dim dDistance As Double
    Call gs_rot3dCOxCOyWjm(vx3In, obj2D, False, v2)
    v1=v2
'The call routine above compensates for the orientation Cx and Cy values of the image sensor to transform the right imaging device coordinate system to the chosen coordinate system. The compensation of the Cy value which may be obtained by an angular rotation in the X'-axis which changes the position of the Y'–Z' plane. The starting point and the ending point of the right line of sight is compensated by the angular rotation amount for the change in the Y'–Z' plane. The compensation of the Cx value may be obtained by the angular rotation in the Y'-axis which changes the position of the X'–Z' plane. The starting point and the ending point of the right line of sight is compensated by the angular rotation amount for the change in the Y'–Z' plane. When the orientation Cx and Cy is compensated for the right imaging device, the center of the right imaging sensor is aligned with the pin hole of the right imaging device and the origin of the chosen coordinate system. The new position of the starting point and the ending point of the right line of sight reflects the perception of the points from the changed position of the right image sensor.'
    dTwist=obj2D.f2_dCAMTtwist * const_PI/190
    Call gs_rot3dZ(-dTwist, v1, v2)
    v1=v2
'The call routine above compensates for the roll of the right image sensor with respect of the chosen coordinate system. The compensation of the roll value which may be obtained by an angular rotation in the Z'-axis which changes the position of the X'–Y' plane. The starting point and the ending point of the right line of sight is compensated by the angular rotation amount for the change in the X'–Y' plane. The new position of the starting point and the ending point of the right line of sight reflects the perception of the points from the changed position of the right image sensor.'
    'move by f along z axis to move us into the center of the world
    dDistance=obj2D.f2_dCAMZ
    v1.dZ=v1.dZ +dDistance
'Above three lines illustrate compensating for the radius of the transformed right imaging device coordinate system. Note that once Cx, Cy and roll has been compensated, the right imaging device coordinate system is aligned with the chosen coordinate system having the origin at the pin hole of the right imaging device. By moving the origin at the pin hole to the origin of the chosen coordinate system, the position of the starting point and the ending point of the right line of sight reflects the perception of the points with the right image sensor at the origin. This is performed by compensating for the radius, latitude angle and longitude angle of the right imaging device coordinate system to the coordinate system into the chosen coordinate system.'
    dLatitude=obj2D.f2_dCAMTlat * const_PI/190
    Call gs_rot3dX(-dLatitude, v1, v2)
    v1=v2
'Above three lines illustrate compensating for the latitude angle.'
    dLongitude=obj2D.f2_dCAMTlong * const_PI/190
    Call gs_rot3dY(dLongitude, v1, v2)
    v1=v2
'Above three lines illustrate compensating for the longitude angle.'
    vx3Out=v2
End Sub
Below are exemplary codes for the subroutine call to compensate for the orientation Cx and Cy values of the image sensor to transform the right imaging device coordinate system to the chosen coordinate system.'
Public Sub gsrot3dCOxCOyWjm(vx3In As VERTEX3D, obj2D As Object, forward As Boolean, vx3Out As VERTEX3D)
    Dim vx2v1 As VERTEX2D
    Dim vx2v2 As VERTEX2D
    Dim vx3v1 As VERTEX3D
    Dim vx3v2 As VERTEX3D
    Dim vx3Rot As VERTEX3D
    Dim dCosAngle As Double
    Dim dAngle As Double
    'create the corrected 2d coordinates
    vxv1.dx=obj2D.f2_iCAMCOx—obj2D.f2_iCAMCx/2
    vx2v1.dy=obj2D.f2 iCAMCOy—obj2D.f2 iCAMCy/2
    'undo cox,coy through a rotation around the normal which is spanned by pinhole,cox,coy, and pinhole,O,O ((z, x,y) as unit vectors)'
    'build 3d vectors for the two known points
    vx3v1.dx=0
    vx3v1.dy=0
    vx3v1.dZ=obj2D.f2_dCAMF
    vx3v2.dx=vx2v2.dx
    vx3v2.dy=vx2v2.dy
    vx3v2.dZ=obj2D.f2_dCAMF
    'get the rotation angle and the normal vector
    Call gs_CosAngle3(vx3v1, vx3v2, dCosAngle)
    Call gs_ArcCos(dCosAngle, dAngle)
    If bForward=False Then
    dAngle=-dAngle
    End If
    Call gs_orth3(vx3v1, vx3v2, vx3Rot)
    Call gs_rot3dVec(dAngle, vx3Rot, vx3In, vx3Out)
End Sub
'The subroutine below illustrates the second procedure in further details.' Public Sub tc_Ln3ObjMakeLn2(ln3A As LINE3D, ln2A As LINE2D, obj2D As
    Object)
    Dim vx2 As VERTEX2D
    Dim vx2B As VERTEX2D
    Dim vx3AWorld As VERT_X3D
    Dim vx3ACam As VERTEX3D
    Dim vx3BWorld As VERTEX3D
    Dim vx3BCam As VERTEX3D
    'transform the 3D line into camera coordinates
    vx3AWorld=ln3A.vx3A
    vx3BWorld=ln3A.vx3B
    Call gs_XformWorldToCamera(vx3AWorld, vx3ACam, vx2A, obj2D)

'The call routine above transforms the starting point of the right line of sight in the chosen coordinate system into a coordinate in the left image sensor plane in the left imaging device coordinate system.'

Call gs_XformWorldToCamera(vx3BWorld, vx3BCam, vx2B, obj2D)

'The call routine above transforms the ending point of the right line of sight in the chosen coordinate system into a coordinate in the left image sensor plane in the left imaging device coordinate system.' ln2A.vx2A=vx2A
ln2A.vx2B=vx2B
End Sub

'Below is an exemplary call routine to transform a point in the chosen coordinate system to a point in the imaging device coordinate system. The routine below may be applied to the starting point and the ending point of the right line of sight.'

Public Sub gs_XformWorldToCameraWjm(vx3In As VERTEX3D, vx3Out As
  VERTEX3D, obj2D As Object)
  Dim dAlpha As Double
  Dim dBeta As Double
  Dim dF As Double
  Dim dDistance As Double
  Dim dLongitude As Double
  Dim dLatitude As Double
  Dim dTwist As Double
  Dim vx3Rot As VERTEX3D
  Dim iCOx As Integer
  Dim iCOy As Integer
  Dim iCx As Integer
  Dim iCy As Integer
  Dim vx3v1 As VERTEX3D
  Dim vx3v2 As VERTEX3D
  dLongitude=obj2D.f2_dCAMTLong * 3.1415926/180
  dLatitude=obj2D.f2_dCAMTlat *3.1415926/180
  dTwist=obj2D.f2_dCAMTtwist * 3.1415926/180
  dF=obj2D.f2_dCAMF
  dDistance=obj2D.f2_dCAMZ
  Call gs_rot3dY(-dLongitude, vx3In, vx3v2)
  'The above call routine applies a longitude angle of the pin hole of the left imaging device to a point in the chosen coordinate system.'
  vx3v1=vx3v2
  Call gs_rot3dX(dLatitude, vx3v1, vx3v2)
  'The above call routine applies a latitude angle of the pin hole of the left imaging device to the point in the chosen coordinate system.'
  vx3v1=vx3v2
  vx3v1.dZ=vx3v1.dZ—dDistance
  'The above call routine applies a radius of the pin hole of the left imaging device to the point in the chosen coordinate system.'
  Call gs_rot3dZ(dTwist, vx3v1, vx3v2)
  'The above call routine applies a roll of the left image sensor to the point in the chosen coordinate system.'
  vx3v1=vx3v2
  'apply c0x,c0y
  Call gs_rot3dCOxCOyWjm(vx3v1, obj2D, True, vx3v2)
  'The above call routine applies a Cx and Cy of the image sensor to the point in the chosen coordinate system.'
  vx3v1=vx3v2
  vx3Out=vx3v2
  End Sub Note that once the coordinates of the starting point and the ending point in the right imaging device coordinate system have been transformed to coordinates in the left imaging device coordinate system, the pin hole of the left imaging device, which may be the origin of the left imaging device coordinate system may be used to project the transformed starting point and the ending point onto the left image sensor. Stated differently, from the known coordinates of the starting point and the ending point in the left imaging device coordinate system, the known coordinate of the left pin hole, two equations may be determined that passes through the pin hole and image sensor, the two equations corresponding to line of sight of the starting point and the ending point. From the known pin hole length of the left imaging device, the two points on the location of the left image sensor may be determined. From the two located points, a line may be traced on the left image sensor corresponding to the line of sight of the first imaging device perceived by the left image sensor.

At block 126, the computing device determines the X, Y, Z coordinates of the corresponding point D2 (see FIG. 12) at the left image sensor 14 and using the known X, Y, Z coordinate of the left pin hole PL determined through calibration, an equation representing a line L2 passing through the corresponding point D2 and the left pin hole PL is derived. Block 128 illustrates the computing device calculating the X, Y, Z coordinate of a point on the object corresponding to the designated point at the right image sensor using the equations derived from block 124 and block 126. Note that the equations have variables in terms of the pin hole coordinate which is defined in terms of a coordinate in the chosen coordinate system. Thus, the X, Y, Z coordinate of the point on the object would be a coordinate in the chosen coordinate system. Block 130 illustrates determining if there are any more points on the vertical line to be processed and if so, the counter is incremented and the steps illustrated in blocks 120–130 executed. Block 132 illustrates determining if there are any more vertical lines to be processed. Blocks 120–132 illustrates if there are more vertical lines to be processed, the counter in incremented and the process is repeated. Otherwise the extraction of the 3-D data is complete and the process halts.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

We claim:

1. A method of determining position and orientation of an imaging device having an image sensor with respect to a chosen coordinate system comprising:

determining a deviation of said image sensor, wherein said deviation is determined between an imaging device coordinate system and said chosen coordinate system;

determining a roll of said image sensor with respect to said chosen system;

determining a pin hole coordinate of said imaging device with respect to said chosen coordinate system.

2. The method according to claim 1, wherein determining said deviation of said image sensor further comprises:

imaging a first reference point in said chosen coordinate system to said image sensor of said imaging device;

obtaining a first value and a second value corresponding to said deviation between said imaged first reference point and a second reference point in said image sensor.

3. The method according to claim 2, further comprising:

determining a first axis passing through said first reference point in said chosen coordinate system and a pin hole of said imaging device;

simulating rotation of said image sensor in a X'-axis and a Y'-axis of said imaging device coordinate system with respect to a pin hole of said imaging device until said second reference point aligns with said first axis, where a X'–Y' plane corresponds to a plane of said image sensor;

obtaining said first value corresponding to an angular deviation in said X'-axis and obtaining said second value corresponding to an angular deviation in said Y'-axis.

4. The method according to claim 3, wherein said first reference point in said chosen coordinate system is an origin of said chosen coordinate system, said second reference point in said image sensor is a center of said image sensor.

5. The method according to claim 1, wherein determining said roll of said image sensor further comprises:

choosing one of a X-axis and a Y-axis in said chosen coordinate system;

simulating rotation of said image sensor about a Z'-axis of said imaging device coordinate system with respect to a pin hole of said imaging device until a side of said image sensor is in a similar orientation with said chosen axis of said chosen coordinate system imaged in an image sensor plane, where said Z'-axis is normal to a plane of said image sensor;

determining a third value corresponding to said rotation of said image sensor.

6. The method according to claim 1, wherein said pin hole coordinate comprises latitude angle, longitude angle, radius corresponding to a polar coordinate system of said chosen coordinate system, said chosen coordinate system further having a third reference point between a fourth reference point and a fifth reference point and having said third reference point between a sixth reference point and a seventh reference point.

7. The method according to claim 6, wherein a second axis passing through said fourth and fifth reference points is substantially parallel of a Y-axis of said chosen coordinate system, said third reference point is aligned with said second axis, the method further comprises:

obtaining a fourth value corresponding to said latitude of said pin hole coordinate by simulating movement of said image sensor along said Y-axis of said chosen coordinate system until, from said image sensor's perspective, a distance between said fourth reference point and said third reference point, and a distance between said fifth reference point and said third reference point corresponds to a predetermined ratio.

8. The method according to claim 7, wherein an eighth reference point is placed closer to said image sensor than said reference points in said chosen coordinate system, the method comprises simulating movement of said image sensor along said Y-axis of said chosen coordinate system until said eighth reference point aligns with said second axis from said image sensor's perspective;

obtaining a fourth value for said latitude of said pin hole coordinate.

9. The method according to claim 6, wherein a third axis passing through said sixth and seventh reference points is substantially parallel of a X-axis of said chosen coordinate system, said third reference point is aligned with said third axis, the method further comprises:

obtaining a fifth value corresponding to said longitude of said pin hole coordinate by simulating movement of said image sensor along said X-axis of said chosen coordinate system until, from said image sensor's perspective, a distance between said sixth reference point and said third reference point, and a distance between said seventh reference point and said third reference point corresponds to a predetermined ratio.

10. The method according to claim 9, wherein a ninth reference point is placed closer to said image sensor than said reference points in said chosen coordinate system, the method comprises simulating movement of said image sensor along said X-axis of said chosen coordinate system until a distance between said ninth reference point and one of said third, sixth, and seventh reference point and a distance between two of said third, sixth, and seventh reference points are at a predetermined ratio from said image sensor's perspective;

obtaining a fifth value for said longitude of said pin hole coordinate.

11. The method according to claim 6, comprising:

obtaining a sixth value corresponding to said radius by determining a ratio of a known distance between two reference points and a measurement of said known distance projected onto said image sensor, said ratio multiplied by a pin hole length.

12. A method of determining position and orientation of an imaging device having an image sensor with respect to a chosen coordinate system comprising:

providing a calibration target in said chosen coordinate system;

capturing an image of said calibration target using said imaging device;

determining a deviation of said image sensor of said imaging device with respect to said chosen coordinate system using said image of said calibration target, wherein said imaging device has an imaging device coordinate system;

determining a roll of said image sensor with respect to said chosen coordinate system using said image of said calibration target;

determining a pin hole coordinate of said imaging device with respect to said chosen coordinate system using said image of said calibration target.

13. The method according to claim 12, wherein said calibration target having a first reference point, determining said deviation of said image sensor further comprises:

imaging said first reference point of said calibration target to said image sensor of said imaging device;

obtaining a first value and a second value corresponding to said deviation between said imaged first reference point and a second reference point in said image sensor.

14. The method according to claim 13, further comprising:

determining a first axis passing through said first reference point in said calibration target and a pin hole of said imaging device;

simulating rotation of said image sensor in a X'-axis and a Y'-axis of said imaging device coordinate system with respect to a pin hole of said imaging device until said second reference point aligns with said first axis, where a X'–Y' plane corresponds to a plane of said image sensor;

obtaining said first value corresponding to an angular deviation in said X'-axis and obtaining said second value corresponding to an angular deviation in said Y'-axis.

15. The method according to claim 14, wherein said first reference point is a center of said calibration target corresponding to an origin of said chosen coordinate system, said second reference point in said image sensor is a center of said image sensor.

16. The method according to claim 12, wherein determining said roll of said image sensor further comprises:
choosing one of a X-axis and a Y-axis in said chosen coordinate system;
simulating rotation of said image sensor about a Z'-axis of said imaging device coordinate system with respect to a pin hole of said imaging device until a side of said image sensor is in a similar orientation with said chosen axis of said chosen coordinate system imaged in an image sensor plane, where said Z'-axis is normal to a plane of said image sensor;
determining a third value corresponding to said rotation of said image sensor.

17. The method according to claim 12, wherein said pin hole coordinate comprises latitude angle, longitude angle, radius corresponding to a polar coordinate system of said chosen coordinate system, said calibration target further having said first reference point between a third reference point and a fourth reference point and having said first reference point between a fifth reference point and a sixth reference point.

18. The method according to claim 17, wherein a second axis passing through said third and fourth reference points of said calibration target is substantially parallel of a Y-axis of said chosen coordinate system, said first reference point of said calibration target is aligned with said second axis, the method further comprises:
obtaining a fourth value corresponding to said latitude of said pin hole coordinate by simulating movement of said image sensor along said Y-axis of said chosen coordinate system until, from said image sensor's perspective, a distance between said third reference point and said first reference point, and a distance between said fourth reference point and said first reference point of said calibration target corresponds to a predetermined ratio.

19. The method according to claim 17, wherein a third axis passing through said fifth and sixth reference points of said calibration target is substantially parallel of a X-axis of said chosen coordinate system, said first reference point of said calibration target is aligned with said third axis, the method further comprises:
obtaining a fifth value corresponding to said longitude of said pin hole coordinate by simulating movement of said image sensor along said X-axis of said chosen coordinate system until, from said image sensor's perspective, a distance between said fifth reference point and said first reference point, and a distance between said sixth reference point and said first reference point of said calibration target corresponds to a predetermined ratio.

20. The method according to claim 17, comprising:
obtaining a sixth value corresponding to said radius by determining a ratio of a known distance between two reference points of said calibration target and a measurement of said known distance projected onto said image sensor, said ratio multiplied by a pin hole length.

21. An apparatus suitable for determining position and orientation of an imaging device having an image sensor with respect to a chosen coordinate system comprising:
a calibration target; and
a processor to process with respect to a chosen coordinate system, a deviation of said image sensor, wherein said deviation is determined between an imaging device coordinate system and said chosen coordinate system, a roll of said image sensor with respect to said chosen system, and a pin hole coordinate of said imaging device, using said calibration target.

22. The apparatus according to claim 21, wherein said calibration target having at least one reference point positioned closer to said imaging device with respect to remaining reference points in said calibration target.

* * * * *

UNITED STATES PATENT AND TRADEMARK OFFICE
CERTIFICATE OF CORRECTION

PATENT NO.    : 6,195,455 B1                                                Page 1 of 1
DATED         : February 27, 2001
INVENTOR(S)   : Mack et al.

It is certified that error appears in the above-identified patent and that said Letters Patent is hereby corrected as shown below:

<u>Column 8,</u>
Lines 36 and 39, delete "comers", insert -- corners --.

<u>Column 11,</u>
Lines 5 and 6, delete "vx2A(O)", insert -- vx2A(0) --.

<u>Column 19,</u>
Line 20, delete "rot3dCOxCOyWjm", insert -- rot3dC0xC0yWjm --.

<u>Column 20,</u>
Line 21, delete "gsrot3dCOxCOyWjm", insert -- gsrot3dC0xC0yWjm --.
Line 32, delete "iCAMCOx", insert -- iCAMC0x --.
Line 33, delete "f2 iCAMCOy", insert -- f2_iCAMC0y --.
Line 35, delete "O,O" after "and pinhole", insert -- 0,0 --.
Line 57, delete "vx2", insert -- vx2A --.

<u>Column 21,</u>
Line 30, delete "iCOx", insert -- iC0x --.
Line 31, delete "iCOy", insert -- iC0y --.
Line 60, delete "rot3dCOxCOyWjm", insert -- rot3dC0xC0yWjm --.

Signed and Sealed this

Fourth Day of February, 2003

JAMES E. ROGAN
*Director of the United States Patent and Trademark Office*